Jan. 12, 1971 W. E. ZWIACHER ET AL 3,553,926
METHOD OF BOXING LAYERS OF ARTICLES SUCH AS FRUIT AND THE LIKE
Original Filed Aug. 16, 1965 15 Sheets-Sheet 1

INVENTORS
WAYNE E. ZWIACHER
LOUIS D. KASER
MAURICE V. JOHNSON, JR.
ALFRED H. FENNELL
FRED W. RIDDINGTON
BY
Paul A. Weilein
ATTORNEY INVENTORS
WAYNE E. ZWIACHER
LOUIS D. KASER
MAURICE V. JOHNSON, JR.
ALFRED H. FENNELL
FRED W. RIDDINGTON
BY
Paul A. Weilein
ATTORNEY INVENTORS
WAYNE E. ZWIACHER
LOUIS D. KASER
MAURICE V. JOHNSON, JR.
ALFRED H. FENNELL
FRED W. RIDDINGTON
BY
Paul A. Weilein
ATTORNEY INVENTORS
WAYNE E. ZWIACHER
LOUIS D. KASER
MAURICE V. JOHNSON, JR.
ALFRED H. FENNELL
FRED W. RIDDINGTON
BY
Paul A. Weilein
ATTORNEY

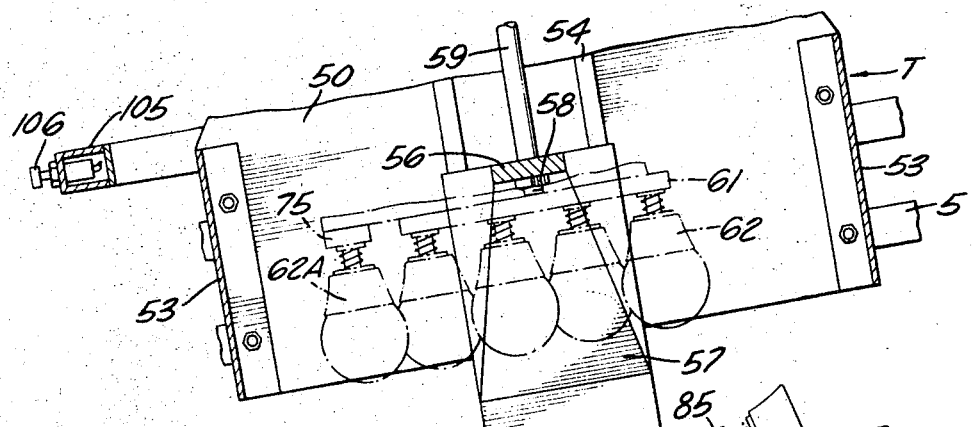
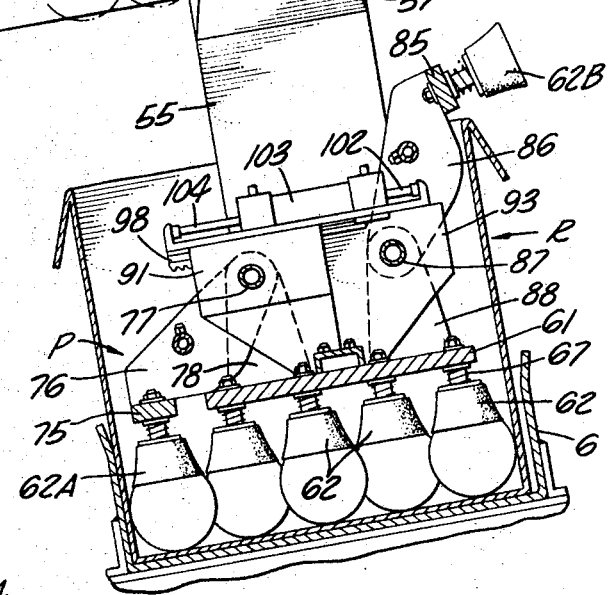
FIG. 14.
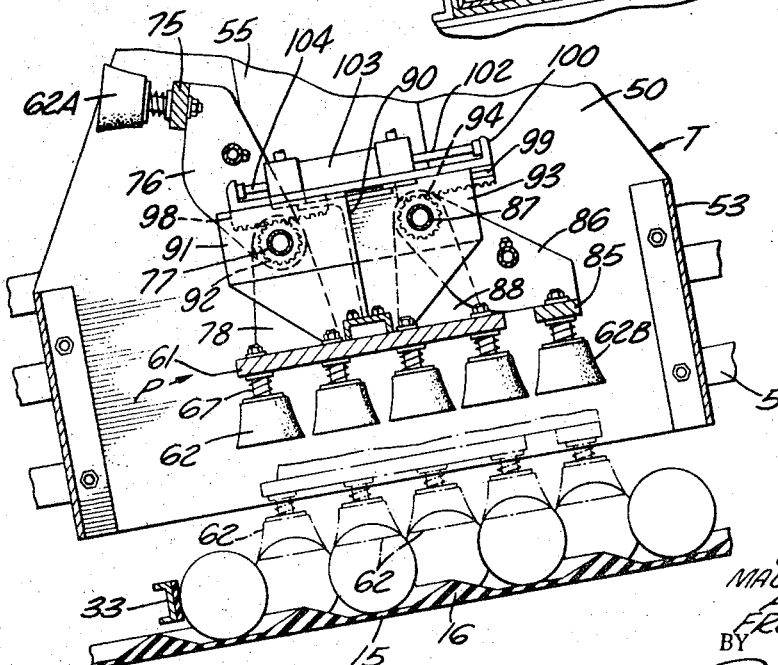
FIG. 15.
INVENTORS
WAYNE E. ZWIACHER
LOUIS D. KASER
MAURICE V. JOHNSON, JR.
ALFRED H. FENNELL
FRED W. RIDDINGTON
BY Paul A. Weilein
ATTORNEY

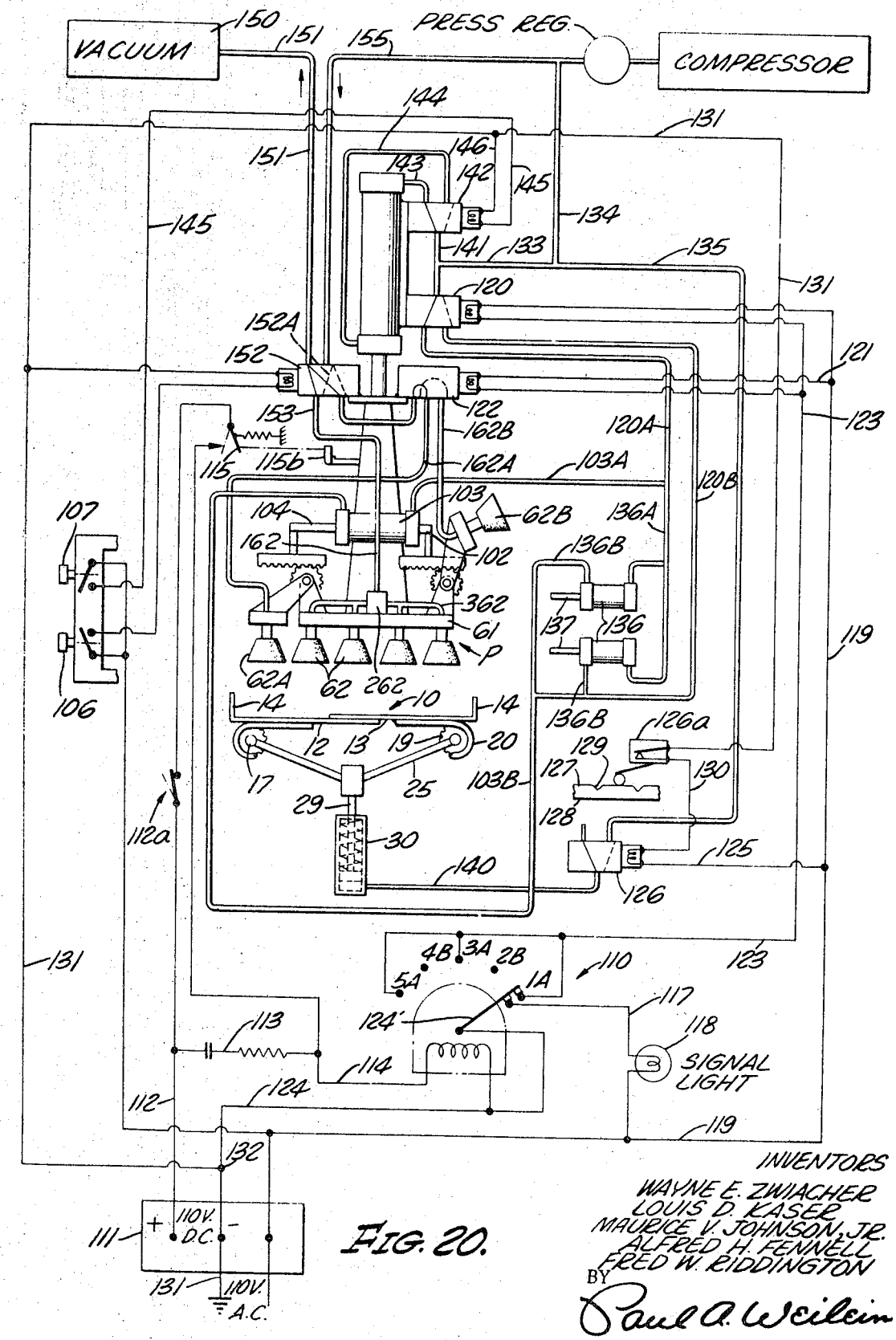

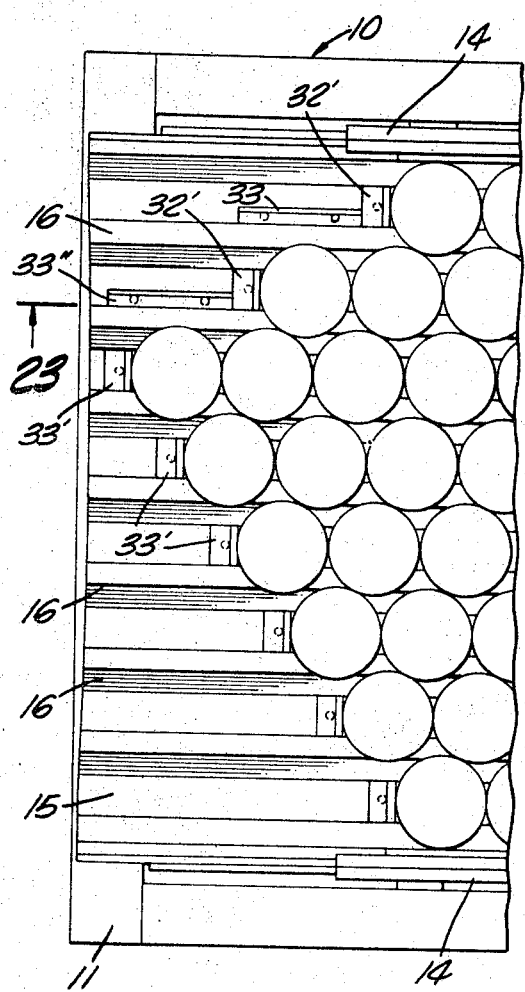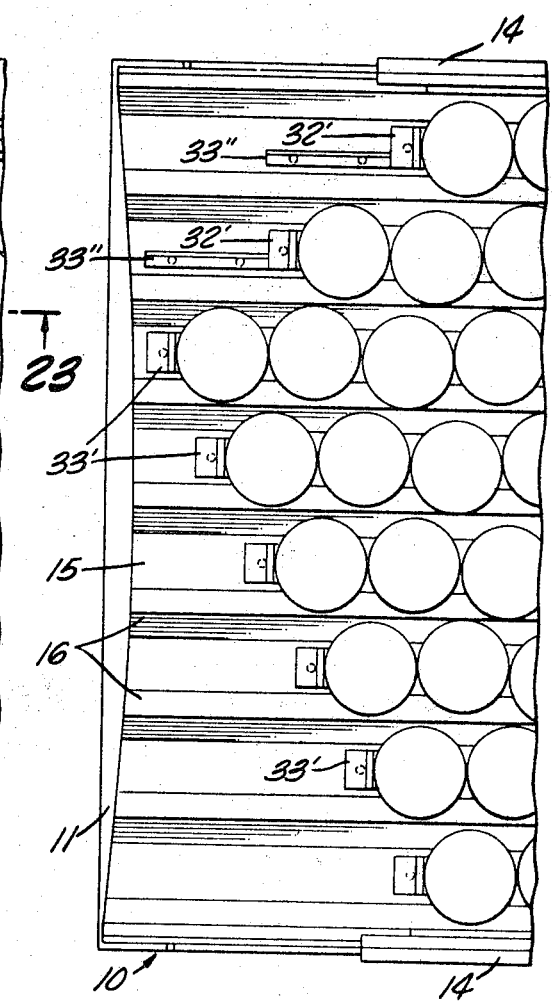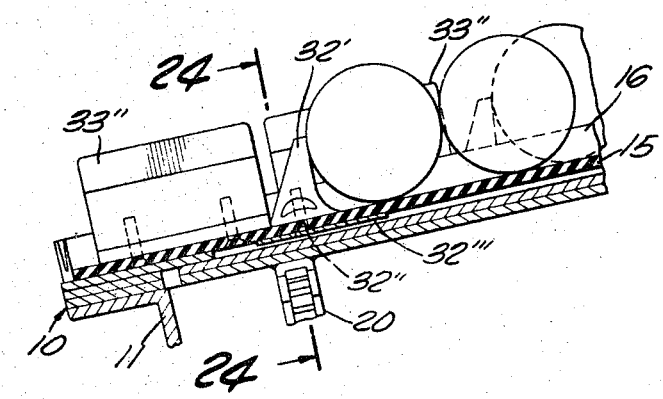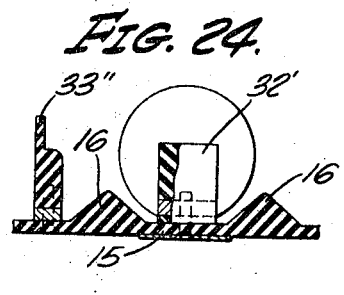

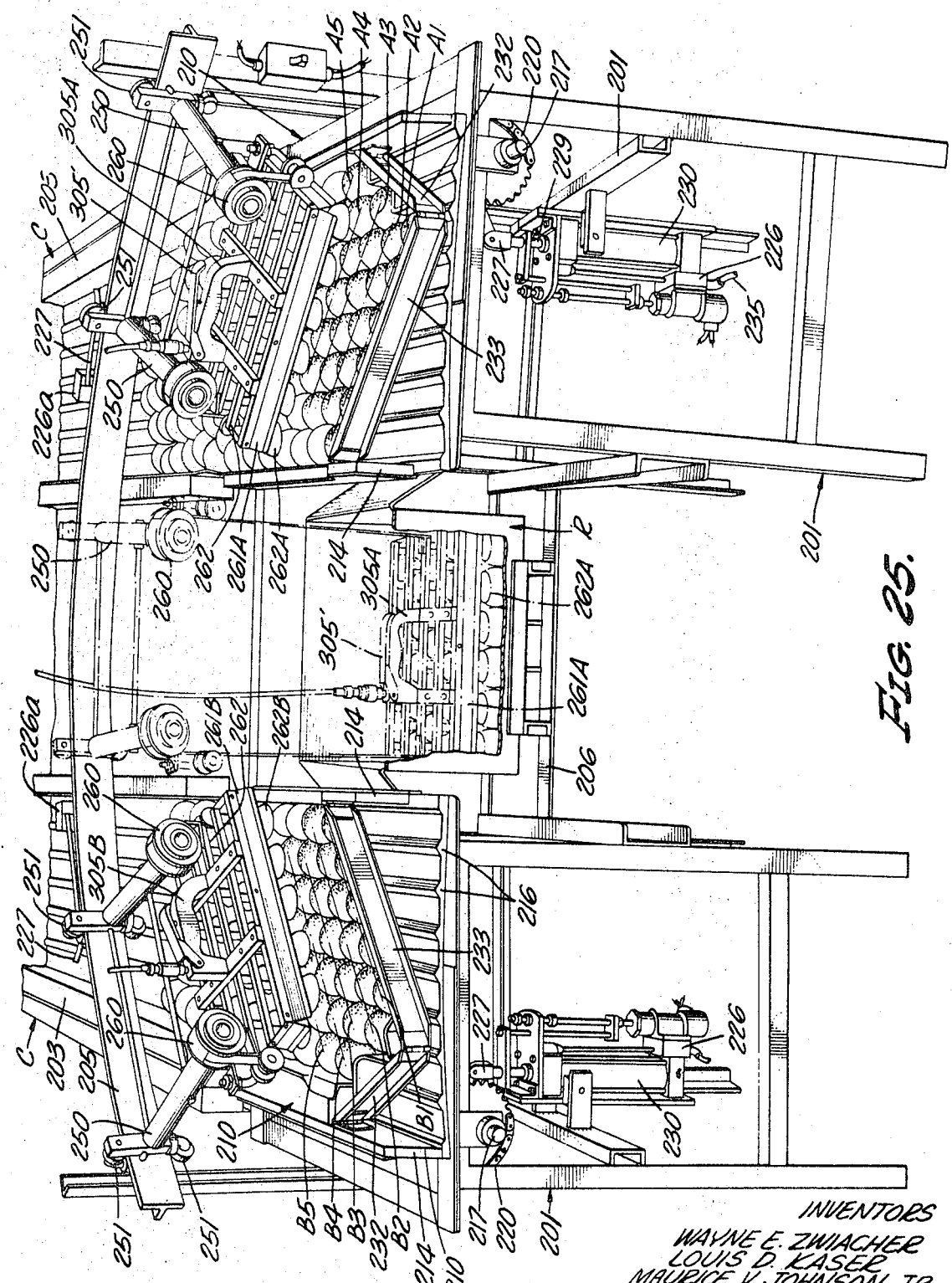

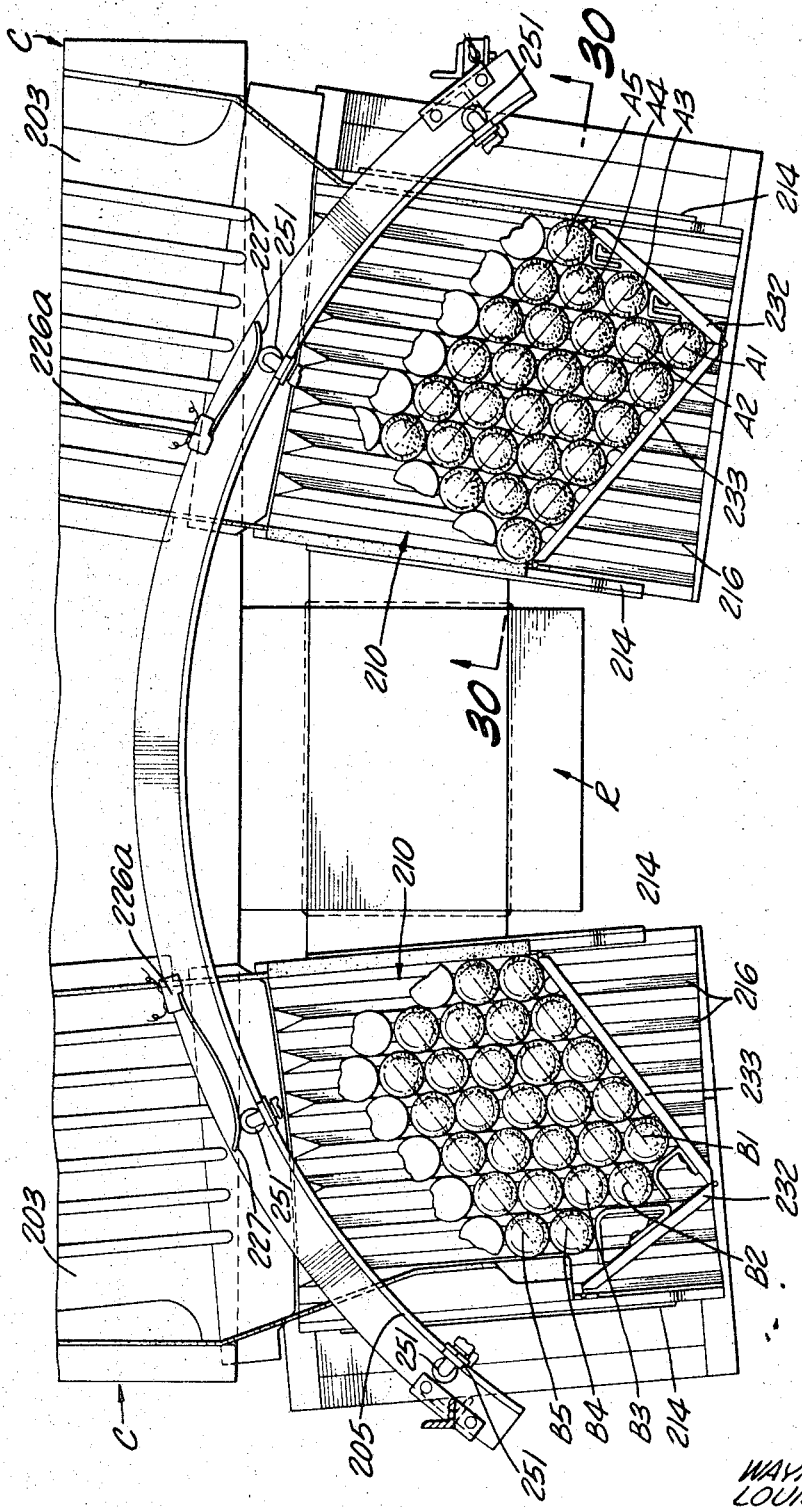

INVENTORS
WAYNE E. ZWIACHER
LOUIS D. KASER
MAURICE V. JOHNSON, JR.
ALFRED H. FENNELL
FRED W. RIDDINGTON
BY
Paul A. Weilein
ATTORNEY

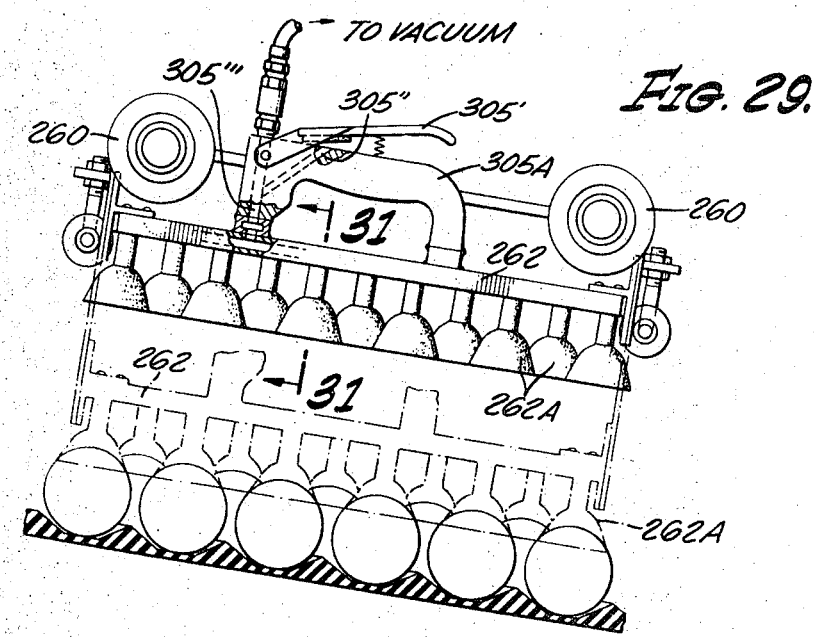
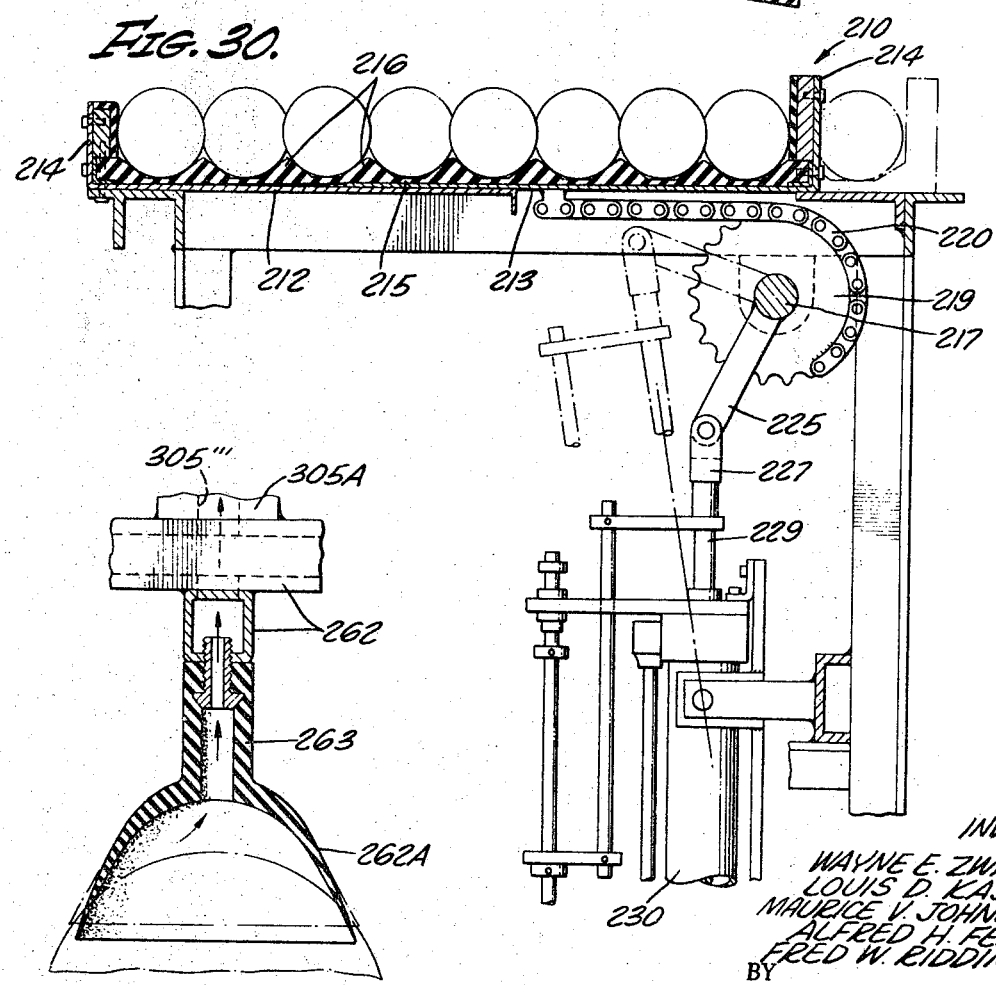

3,553,926
Patented Jan. 12, 1971

3,553,926
METHOD OF BOXING LAYERS OF ARTICLES SUCH AS FRUIT AND THE LIKE
Wayne E. Zwiacher, Ontario, Louis D. Kaser and Maurice V. Johnson, Jr., Upland, and Alfred H. Fennell and Fred W. Riddington, Ontario, Calif., assignors to Sunkist Growers, Inc., Los Angeles, Calif., a corporation of California
Original application Aug. 16, 1965, Ser. No. 480,021, now Patent No. 3,465,495, dated Sept. 9, 1969. Divided and this application Dec. 27, 1968, Ser. No. 787,345
Int. Cl. B65b 5/10, 35/32
U.S. Cl. 53—26                              15 Claims

ABSTRACT OF THE DISCLOSURE

Citrus fruit to be packed into a box is first formed into staggered longitudinal rows on a feed chute and then rectangular pickup means having rows of vacuum pickup cups is positioned diagonally of the chute to pick up a group to form one layer in the box, the successive groups being of staggered patterns for the successive layers to nest together.

---

This application is a division of our co-pending application, Ser. No. 480,021, filed Aug. 16, 1965, entitled Method of and Apparatus for Boxing Layers of Articles Such as Fruit and the Like now issued as Pat. No. 3,465,495.

The present invention relates to a method of placing articles in containers and more particularly to a method whereby a plurality of articles are prearranged on an article delivery chute so as to be transferred from the chute in a prearranged condition and deposited in a receptacle to the end that the receptacle may be packed with the articles in layers which nest or interfit with one another or in layers in which the articles are placed vertically one on top of another.

The present invention contemplates the ultimate placement of layers of fruit or other such articles in a receptacle wherein each layer consists of rows of fruit which interfit or nest with one another lengthwise and widthwise of the receptacle, wherein diagonal rows of fruit within the layer are aligned. Similarly, as viewed vertically, each layer of fruit in the receptacle contains rows which are nested with the subjacent rows. A peculiarity of packaging fruit in this manner is that diagonally extended rows of fruit within the receptacle are in mutually contacting relation, whereas the rows extended parallel to the side and end walls of the receptacle are generally in spaced relation in order to allow such nesting. It is this peculiarity which has occasioned difficulties heretofore in the efficient automatic packaging of fruit in the above mentioned manner and manual packing of the fruit in this manner has been substantially the only successful mode heretofore employed. Obviously, the manual packaging of large numbers of fruit in receptacles involves great expenditures of time and money in the maintenance of labor.

The present invention provides, in addition to the foregoing, for the placement of identical layers in which the articles in the layer are arranged one above the other in stacked relation.

The present invention, moreover, involves the placement or arrangement of groups of fruit or other such articles on a feed chute adapted to feed fruit in rows to a receptacle filling station so that within the rows of fruit on the chute there exists a group of fruit so correlated to one another as to correspond to the desired fruit correlation to be accomplished in placing a layer of fruit in the receptacle. Thus, a primary object of the invention is to arrest the movement of rows of fruit on a feed chute so as to cause the correlative location of the fruit in a pattern corresponding to a layer of fruit to be placed within a receptacle.

Still another object of the invention involves the transfer of prearranged groups of fruit from a delivery chute to the receptacle. In accomplishing this objective, it is a further and more specific objective to transfer groups or layers of fruit from the feed chute so that alternate layers will nest one fruit between subjacent fruit with the diagonal rows of fruit within each layer disposed in mutually contacting relation. In accomplishing this general objective it is still another specific objective to transfer successive similar groups or layers of fruit from the feed chute so that the layers will be stacked in vertical columns.

Another object of the invention is to provide article feeding chute apparatus adapted to predispose rows of articles in a predetermined pattern corresponding to a layer of articles to be transferred to a receptacle, such pattern involving arrangement of rows of fruit extending longitudinaly of the chute so that the diagonally aligned fruit are in mutually spaced relation and the fruit of the longitudinally extended adjacent rows of fruit on the chute are nested.

Still another object of the invention is to provide apparatus for removing groups of fruit which are prearranged in accordance with the next preceding object, from the feed conveyor and placing the same within a receptacle.

Yet another object of the invention is to provide a fruit packing method wherein: fruit is prearranged on a supply chute in longitudinaly extended rows with fruit in adjacent rows nesting; a group of such fruit is removed from the supply chute, such group including a plurality of rows extended diagonally of the chute and respectively having one more or less fruit than the next adjacent diagonal row; such group of fruit is transferred to a receptacle and constitutes a layer of fruit therein; and subsequently another group of fruit is transferred from the supply chute, which latter group is composed of fruit similarly arranged and containing one more or less fruit than the corresponding diagonal row previously transferred from said chute, whereby when said latter layer of said fruit is deposited in said receptacle, the rows of fruit located one above the other will be in nesting relation. By way of an example of this objective, transfer apparatus is provided whereby one layer of fruit removed from the supply chute is of a pattern consisting of five rows of fruit as counted breadthwise of the box in which the two rows adjacent the longitudinal walls of the box and the middle row of fruit each contain six fruit and the two intervening rows of fruit each contain five fruit; whereas in the next group or layer of fruit placed in the box, the layer is of a second pattern in which the two rows adjacent the longitudinal box walls and the middle row each contain five fruit and the two intervening rows contain six fruit, whereby the rows located one over the other and extended lengthwise and breadthwise of the box will nest one within the other and the lengthwise and breadthwise extended rows of fruit will be vertically aligned, though the fruit of the vertically aligned rows are nested, whereas the rows which are longitudinally extended on the chute in mutually contacting engagement, but which are disposed diagonally in the box in the respective layers, are displaced approximately one-half fruit out of vertical alignment so as to nest with adjacent rows diagonally extended in the box. Thus, the two patterns are complementary to each other in the sense that the two patterns nest together. This packing method may be carried out by either of two forms of apparatus as herein disclosed. Accordingly, all of the fruit in adjacent rows both within each layer and within the adjacent vertically spaced layers are in nesting relation and maximum usage is made of the space within the box. In addition, the fruit is interlocked within the box so as to prevent relative shifting during shipment of the box, but the box presents a uniform and aesthetically desirable appearance in that all of the fruit in the rows extended diagonally of the top layer in either direction widthwise of the box are in contacting relation, and a fruit of the subjacent layer is viewed through the spaces in the fruit in all of the rows extended longitudinally and transversely of the box. It will be understood that the above example is illustrative only, and that the number of fruit in the rows may vary depending upon either the size of the fruit or the size of the box.

In accomplishing the packing method, longitudinally extended rows of fruit are formed on a supply chute with the lowermost fruit in the rows aligned diagonally of the chute, and a transfer mechanism having rows of pickup elements corersponding to rows of fruit on the chute is disposed diagonally with respect to the chute to pick off diagonal fruit rows, and then is moved to a receptacle to deposit the picked up fruit as a layer in the receptacle.

Other objects and advantages of the invention will be hereinafter described or will become apparent to those skilled in the art, and the novel features of the invention will be defined in the appended claims.

In the accompanying drawings:

FIG. 14 is a view showing the fruit pickup mechanism of FIG. 13 moved to the fruit discharge location and showing the pickup mechanism in broken lines in an elevated position and in full lines in a position for depositing the fruit within a box;

FIG. 15 is a view generally corresponding to FIG. 13 but illustrating the fruit pickup mechanism actuated to pick up a different fruit pattern;

FIG. 16 is a fragmentary detail view partly in section and partly in elevation illustrating the actuator means for the fruit pickup mechanism;

FIG. 17 is a vertical sectional view as taken on the line 17—17 of FIG. 16;

FIG. 18 is a detail view in section illustrating a typical fruit pickup element;

FIG. 19 is a view corresponding to FIG. 18 illustrating the pickup element in engagement with a fruit;

FIG. 20 is a schematic view illustrating the control and operating system for the machine of FIGS. 1–19;

FIG. 21 is a fragmentary view in plan illustrating a modified fruit pattern arranging chute mechanism;

FIG. 22 is a view generally corresponding to FIG. 21 but illustrating the chute transversely extended;

FIG. 23 is a view in section as taken on the line 23—23 of FIG. 21;

FIG. 24 is a view in section as taken on the line 24—24 of FIG. 23;

FIG. 25 is a predominantly frontal elevation of a modified mechanism for practicing the present invention;

FIG. 26 is a fragmentary view partly in elevation and partly in section illustrating the positioning of fruit on the fruit delivery chutes;

FIG. 29 is a view in section as taken on the line 29—29 of FIG. 27 showing the fruit pickup mechanism in an elevated position in full lines and in broken lines in a fruit pickup position;

FIG. 30 is a fragmentary view in section as taken on the line 30—30 of FIG. 26; and FIG. 31 is a detail view in section as taken on the line 31—31 of FIG. 29 and showing a modified fruit pickup element.

Like reference characters in the several views of the drawings and in the following description designate corresponding parts.

Figure 1:
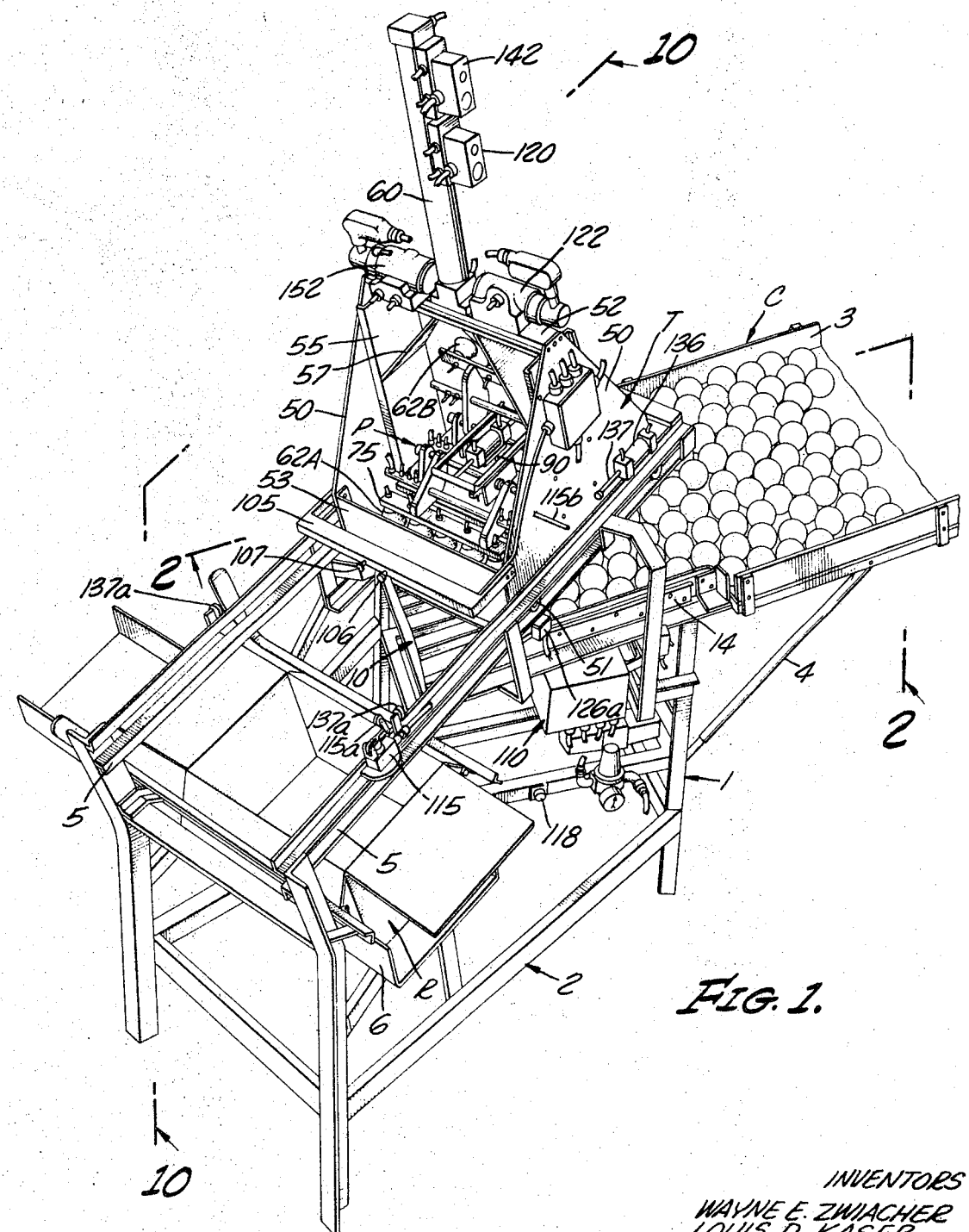
FIG. 1 is a view in perspective illustrating one apparatus useful in the practice of the method hereof and embodying the present invention.
Figure 2:
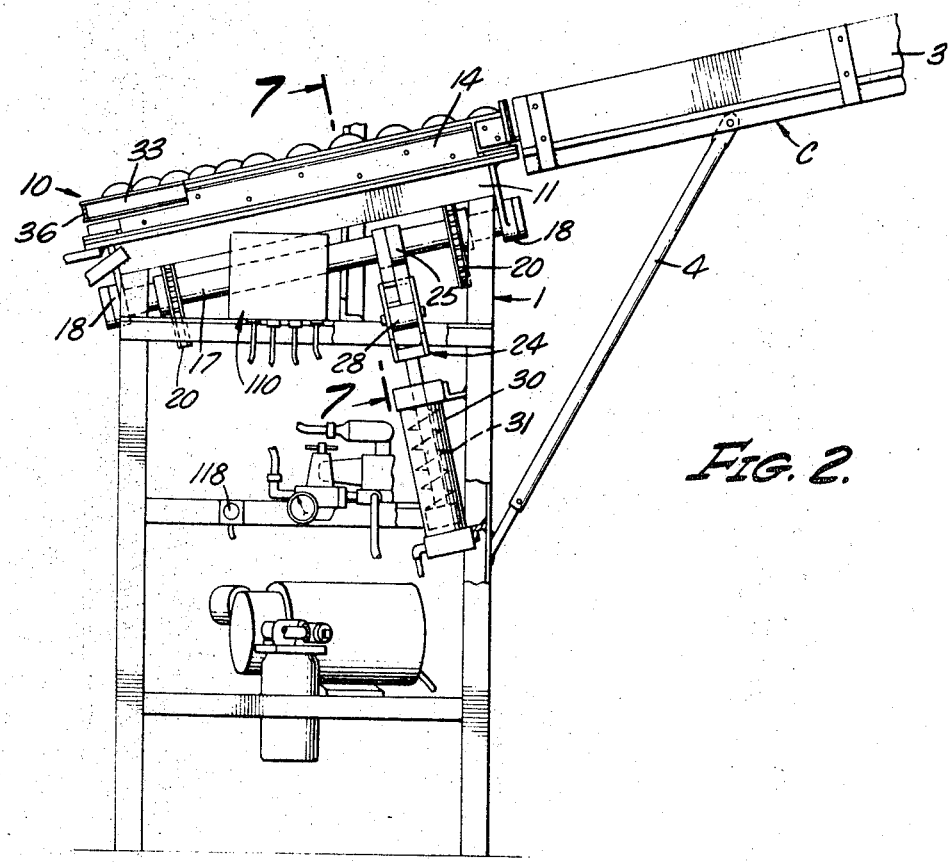
FIG. 2 is a fragmentary vertical sectional view as taken on the line 2—2 of FIG. 1 and more particularly illustrating the chute apparatus.
Figure 7:
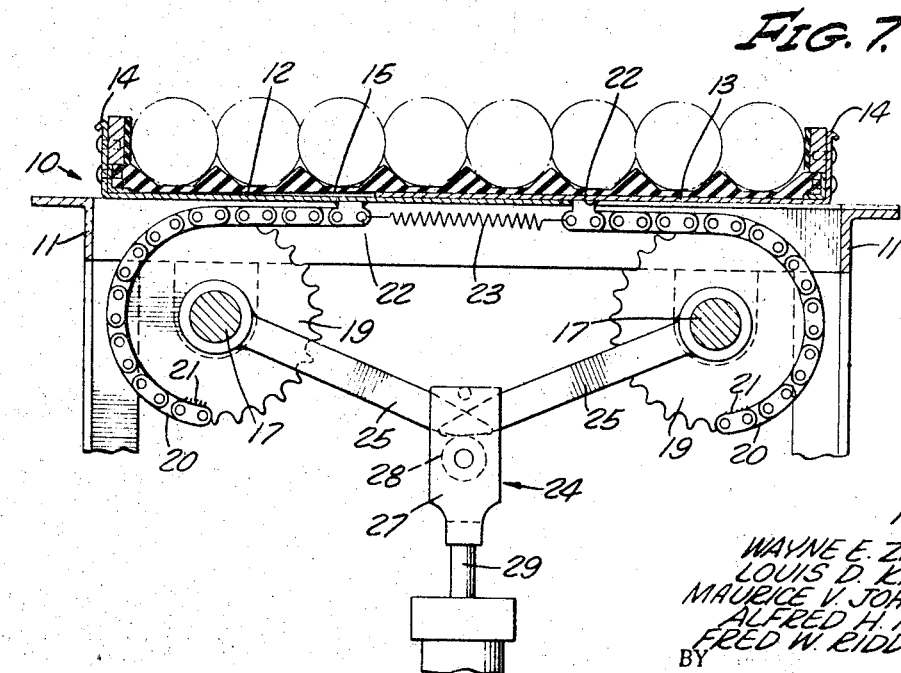
FIG. 7 is a transverse sectional view through the chute mechanism as taken on the plane of line 7—7 of FIG. 2.
Figure 10:
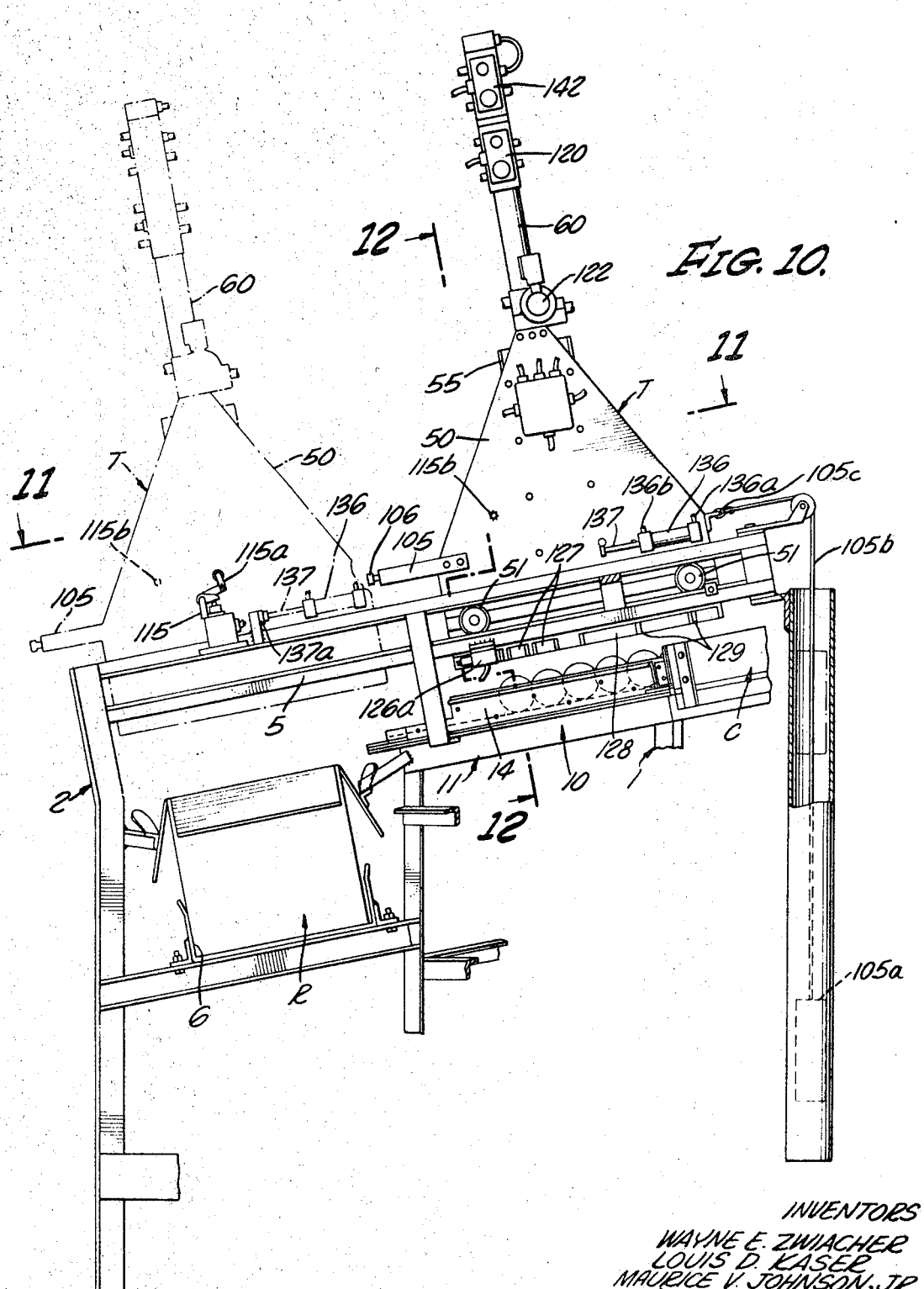
FIG. 10 is a view in vertical section as taken substantially on the line 10—10 of FIG. 1 showing the fruit transfer mechanism in full lines in a fruit pickup position on its supporting frame and showing the fruit transfer mechanism in broken lines in a position for depositing the fruit in a receptacle.

Referring to FIGS. 1, 2, and 10, an illustrative embodiment of an apparatus for practicing the method of the present invention is shown as comprising a composite framework including a first supporting frame 1 on which is mounted a feed chute mechanism generally denoted at C and an angularly related second frame 2 on which is supported a fruit transfer mechanism generally denoted at T.

The chute mechanism includes a chute 3 adapted to be disposed at a suitable inclination and supported on frame 1 by adjustable struts 4, the chute 3 being adapted to receive a supply of fruit in random order from any suitable source. Such a source of fruit would preferably consist of means for supplying the chute 3 with fruit of substantially uniform size ready for packaging or boxing, and an example of such a source is the sizing apparatus disclosed and claimed in Pat. No. 3,244,276, issued Apr. 5, 1966. The chute 3 comprises means which will hereinafter be more fully described for disposing the fruit in alignment in rows extended longitudinally of the chute in position below and between a pair of supporting rails 5, 5 which are carried by the frame 2 and which extend at an angle relative to the chute 3, the transfer mechanism T referred to above being reciprocable on the rails 5 between fruit pickup position as shown in full lines in both FIGS. 1 and 10 and the position shown in broken lines in FIG. 10 whereat the fruit is adapted to be deposited in a receptacle or box generally denoted at R. This box is supported in a guide channel 6 disposed beneath the rails 5, the channel 6 being open at its opposite ends so that the receptacle or box R may be moved endwise in the channel 6 to a position centrally located between the rails 5, there filled with fruit, and thereafter moved endwise from the channel 6.

In accordance with one of the objectives of the invention, it is desired that the fruit fed in random order to the supply chute 3 be aligned in supply rows with each fruit in each supply row contacting the adjacent fruit in its row but with fruit in adjacent rows disposed in nesting relation to one another. Accordingly, the chute 3 is adapted to gravitationally supply fruit from its lower end to a chute section generally denoted at 10 and comprising a support 11 which forms a part of the chute supporting frame 1 and which has transversely slidably disposed therein a pair of plates 12 and 13, the former of which underlies the latter. Each of the plates 12 and 13 is provided with an upstanding side wall 14 and extended between the side walls 14 is a rubber or other suitable fruit supporting base 15 for the chute section 10 which base is provided with transversely spaced ridges 16 between which the fruit will be generally aligned in supply rows as the fruit progresses downwardly over the base 15 of the chute section 10. Upon relative transverse movement of the overlapped plates 12 and 13, the transverse space between the side walls 14 of the chute section 10 is increased and decreased as is the space between the ridges 16 of the chute base 15 whereby to effect agitation of the fruit and ultimate transverse compression of the fruit to a desired extent such that the fruit are effectively prelocated within their supply rows so as to be engaged and picked up by the transfer mechanism.

Means are provided for effecting the just mentioned transverse shifting of the plates 12 and 13 and side walls 14, and in the illustrative embodiment such means, as is best illustrated in FIGS. 2 and 7–9, comprises a pair of rock shafts 17 journalled in bearings 18 carried by the support 11, each rock shaft having thereon a sprocket wheel 19 engaged by a chain 20, one end of which is fixed as by welding at 21 to one of the sprockets 19 and the other end of which is suitably affixed as by welding at 22 to the respective plates 12 and 13. Suitable means such as a spring 23 interconnect the last mentioned ends of the chains 20 so as to normally bias the plates 12 and 13 and their side walls 14 toward one another, and actuator means generally denoted at 24 are provided for effecting intermittent angular movement of the sprockets 19 in a direction to cause movement of the walls 14 away from one another against the bias of the spring 23. This actuator means 24 includes a pair of lever arms 25, one of which projects from the respective rock shafts 17, the free ends of the levers 25 extending into a slot 26 in an actuator head 27 so as to be engaged by a roller 28, the head 27 being supported at the outer end of a reciprocal shaft 29. This shaft 29 extends into a cylinder 30 adapted to be supplied with fluid under pressure to cause projection of the shaft 29.

As shown in FIG. 2, the cylinder 30 may be provided with a spring 31 which is adapted to cause the shaft 29 to be retracted into the cylinder. In a manner which will be hereinafter described, the cylinder 30 is intermittently provided with fluid under pressure to effect reciprocation of the shaft 29, whereby to effect a transverse relative movement of chute walls 14 and agitation of the fruit located between ridges 16 of the transversely expandable chute base 15.

Means are also provided for effecting agitation of the rows of fruit longitudinally between the ridges 16 of the chute base 15 and this means is also adapted to establish an angular relationship between the lowermost fruit in the supply rows of fruit in the chute section 10 corresponding with the side and end walls of the box or receptacle into which a group of the fruit are to be transferred from the chute section 10.

Figure 3:
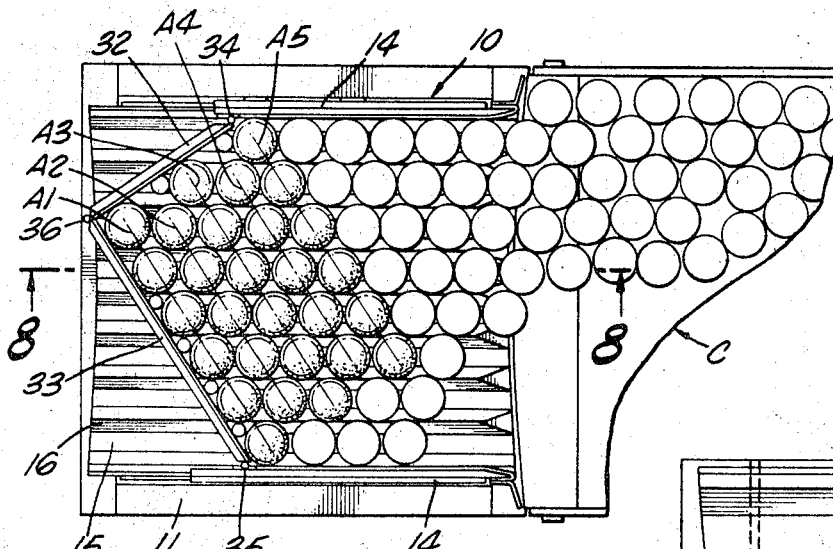
FIG. 3 is a fragmentary view in top plan illustrating the fruit feeding chute and fruit arranging means of FIGS. 1 and 2, the fruit transfer mechanism having been broken away, and showing the rows of fruit on the chute in pattern to be transferred to provide one layer of fruit within a receptacle.
Figure 4:
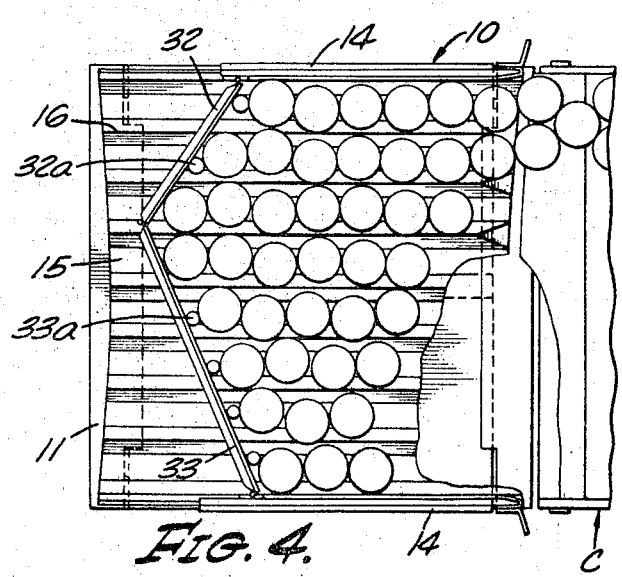
FIG. 4 is a view corresponding to FIG. 3 but showing the chute mechanism in a transversely expanded condition.

As seen in FIGS. 3–6, the means for predetermining the relationship between the lowermost fruit and the adjacent supply rows in the chute 10 and for agitating the supply rows longitudinally comprises a pair of hinged barrier elements designated 32 and 33, the barrier 32 being hinged at 34 to a side wall 14 of the chute section 10 and the barrier 33 being correpsondingly hinged at 35 to the other side wall 14. In addition, the barriers are hingedly interconnected at 36 so that upon transverse movement of the walls 14 toward and away from one another the angular relation between the barriers 32 and 33 will be caused to range between that shown in FIG. 3 and that shown in FIGS. 4 and 6. When the angular relation of barriers 32 and 33 is as shown in FIG. 3, these barriers are disposed in right angular relation, the fruit engaging barrier 33 being alinged with one another for ultimately being picked up and placed along a side wall of the receptacle or box R and the fruit engaging barrier 32 being aligned for ultimate engagement with an end wall of the box R. The barriers 32 and 33 may be provided with spaced elements 32a and 33a whereby to not only assist in agitating the fruit longitudinally of the supply rows between the ridges 16 of the chute section 10, but also to assist, as best seen in FIG. 3, in predetermining the exact spacing between the row of fruit engaged with the respective barriers 32 and 33, which rows are extended diagonally across the chute section 10.

It is notable that each fruit in the respective longitudinally extended supply rows lying between the chute ridges 16 contacts the next adjacent fruit in its row but the angular disposition of the barriers 32 and 33 causes the fruit of the adjacent longitudinally extended supply rows to be displaced longitudinally of one another, the fruit of one row being staggered relative to the fruit of an adjacent row, so that the fruit are transversely nested and form a group of fruit which will fit within the walls of the box R in such a manner that rows of fruit within the box and extending diagonally of the box will be in mutually contacting aligned relation but the rows of fruit within the box spaced transversely of the box will be disposed in nesting relation.

Figure 5:
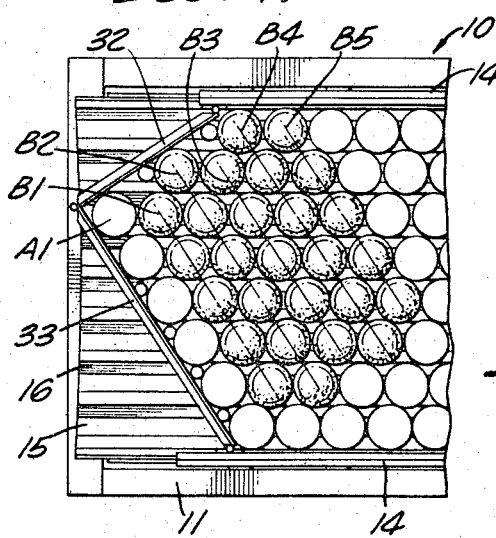
FIG. 5 is a view corresponding to FIG. 3, but illustrating a second group of fruit to be transferred.
Figure 6:
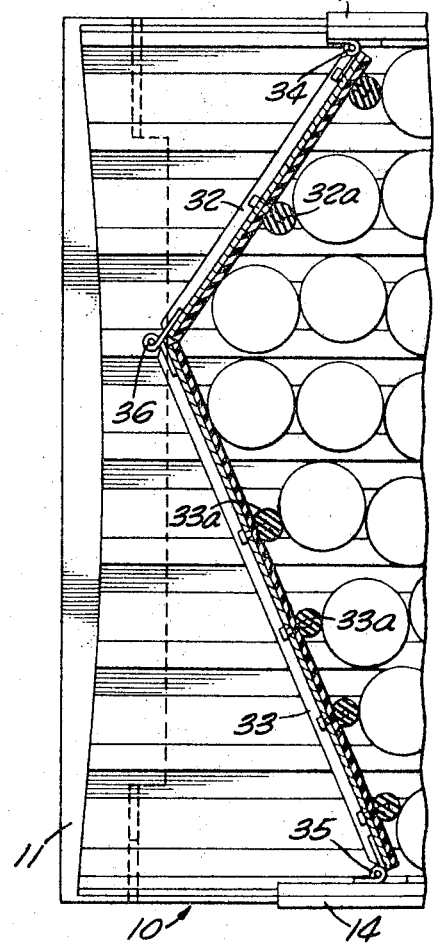
FIG. 6 is an enlarged fragmentary view illustrating the fruit arranging mechanism in its intermediate stage of operation as shown in FIG. 4, with certain of the parts being shown in section.
Figure 8:
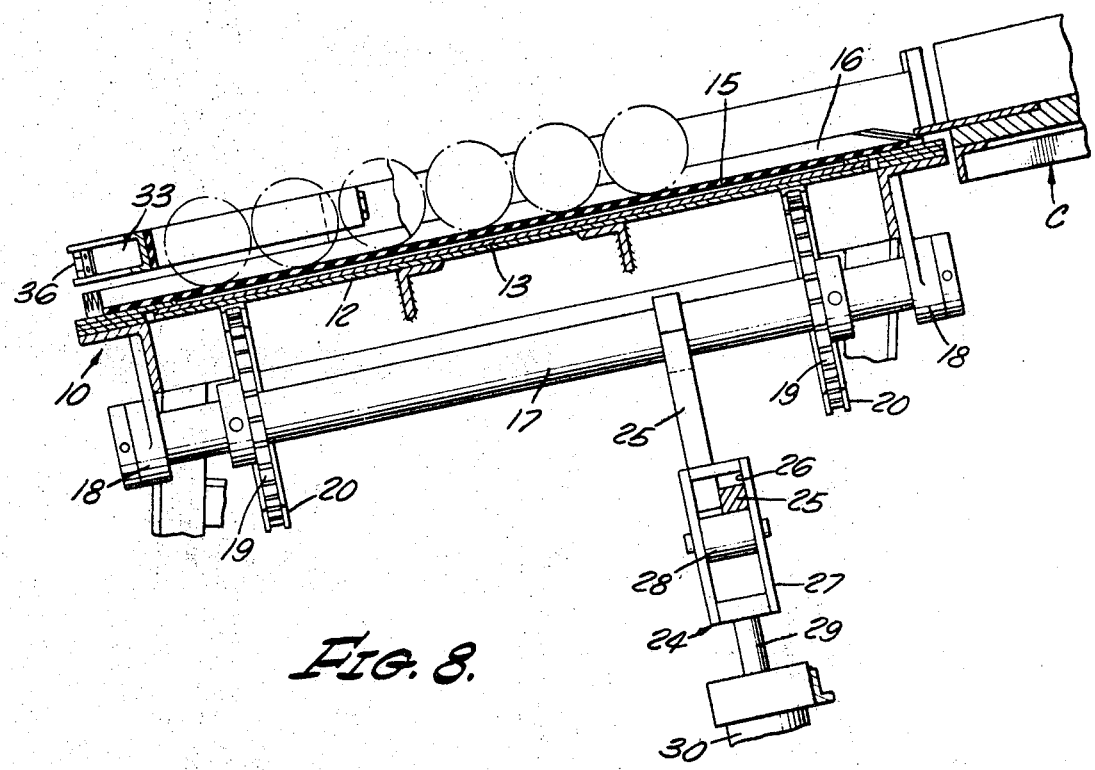
FIG. 8 is a vertical sectional view as taken on the line 8—8 of FIG. 3.
Figure 9:
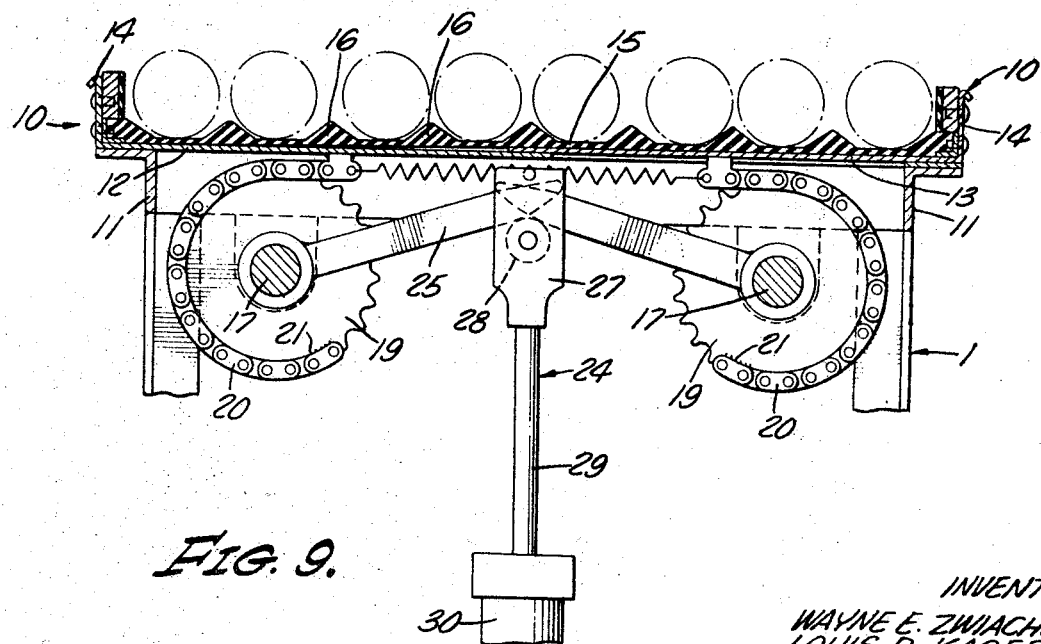
FIG. 9 is a transverse sectional view generally corresponding to FIG. 7 but showing the chute mechanism transversely extended to effect agitation of the fruit.

Referring more particularly in this connection to FIG. 3, it will be seen that the barriers 32 and 33 have provided a first fruit pattern of the general configuration of a rectangle, the rectangle extending diagonally of the supply chute and consisting of five rows extended diagonally of the chute section 10 and respectively designated A1, A2, A3, A4, and A5. It will also be noted that each of rows A1, A3, and A5 consists of six fruit, whereas each of rows A2 and A4 consists of five fruit. In accordance with the present invention, these five rows of fruit which extend diagononally of the chute section 10 are to be transferred from the chute section 10 to the box R simultaneously as the group to make up the bottom layer of fruit within the box. With particular reference to FIG. 5, it will also be noted that there are provided within the rows of fruit above the barriers 32 and 33 a second fruit pattern of the general configuration of a rectangle oriented diagonally of the supply chute and having five rows extending diagonally of the supply chute, the five rows being respectively designated B1, B2, B3, B4, and B5, with rows B1, B3, and B5 consisting of five fruit and rows B2 and B4 consisting of six fruit. The invention contemplates transferring the B rows of fruit as a group and placing them in the box R as a layer nesting with the layer of A fruit. Thus, it is apparent that row B1 nests with row A1, now B2 nests with row A2, etc., the respective rows A1 and B1 and likewise the other vertically aligned rows being displaced approximately one-half fruit from one another, and it is also notable that in each of the layers of A and B fruit those fruit which will be aligned diagonally of the box will be disposed in mutually contacting relation in the respective layers but these diagonally disposed rows will nest with one another as regards the respective layers.

When the box is filled with, for example five alternate layers of A, B fruit, the entire quantity of fruit within the box will be interlocked or nested one with the other so that not only does the invention provide for the efficient boxing of the fruit, but in addition, the fruit will be arranged in a manner which is aesthetically desirable in that the uppermost layer of fruit will present a symmetrical pattern of diagonally extended straight rows of fruit in contacting relation with one another, and all spaces between fruit of the uppermost layer will be above a fruit in the layer below.

Figure 11:
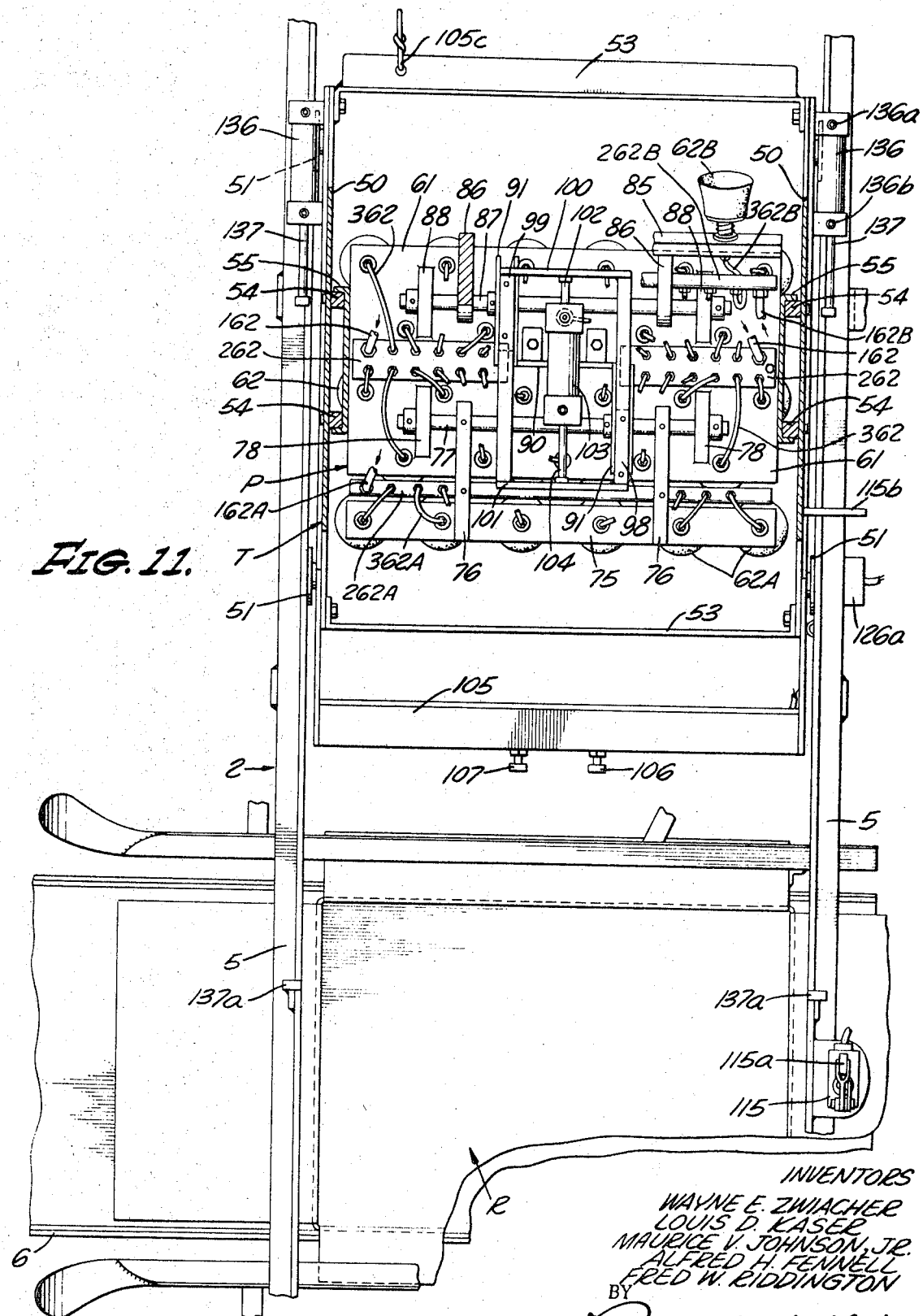
FIG. 11 is a view in section as taken substantially on the plane of the line 11—11 of FIG. 10.

Referring now more particularly to FIGS. 1 and 10–19, the above noted transfer mechanism T is adapted to transfer the groups of fruit consisting of rows A1–A5 and B1–B5 successively from the supply chute section 10 to the receptacle or box R, and this transfer mechanism comprises a frame structure including a pair of spaced-apart side walls 50 respectively supporting rollers 51 which engage the aforementioned rails 5 of the base frame 2. Interconnecting the side walls 50 at the top is a header 52 and at the bottom the sides 50 are interconnected by plates 53. Internally of side walls 50 and as best seen in FIG. 11, they are respectively provided with vertical guides 54 which slidably support a pair of channel members 55, these channel members being interconnected at their upper ends by a cross member 56 and gussets 57. The cross member 56 is connected as at 58 to a rod 59 of an actuator cylinder 60, this rod 59 extending through the header 52 so as to effect vertical reciprocation of the members 55 between the side walls 50. Extended between the reciprocal members 55 and suitably integrally connected therewith is a horizontally extended supporting plate 61 forming part of pickup mechanism P which is adapted to reciprocate with the members 55 upon reciprocation of the actuator rod 59.

This pickup mechanism includes four rows of vacuum pickup elements or cups generally denoted at 62 and in this illustrative embodiment each including a stem 63 which extends through a downwardly tapered opening 64 in the support plate 61, the stem 63 being suspended in the opening on an upper washer 65 and being normally biased downwardly to effect engagement of washer 65 with plate 61 by means of a spring 67 which surrounds the stem 63 and engages at one end a washer 68 disposed about the stem and engaged with plate 61 and which engages at its other end with a head 69. This head supports a resilient cup 70 and a disk 71. Upon engagement of the flexible skirt 72 of the cup 70 with a fruit denoted at F, as best seen in FIG. 19, the cup 70 may be subjected to an internal partial pressure reduction through an opening 71a in disk 71 and a passage 63a in the stem 63 of the pickup elements. The four rows of pickup elements supported by the plate 61 are generally disposed on centers which are disposed in rows corresponding to a pattern of fruit located on the chute section 10 by the barrier members 32 and 33, these groups of fruit comprising rows A2–A5 and rows B1–B4 in the groups illustrated in FIGS. 3 and 5 respectively. Upon lowering of the plate 61 so that the respective pickup elements 62 engage the fruit in either of the groups of rows just mentioned and upon evacuation of the respective cups, the groups of fruit will be held by the pickup element 62 and subsequent elevation of the pickup elements will cause such rows of fruit to be removed from the supply chute section 10.

It will be noted that the pickup elements thus far described consist of only four rows of pickup elements, whereas it is desired to pick up from the supply chute section 10 five diagonally arranged rows of fruit. Accordingly, the pickup means also includes a pair of auxiliary rows of pickup elements respectively designated 62A and 62B which are alternately employed when the A rows of fruit are being removed from the supply chute 10 and when the B rows of fruit are being removed from the supply chute 10.

The row of auxiliary cups 62A are supported on a bar 75 which is connected between its ends to a pair of lever arms 76. The lever arms 76 are fixed to a rock shaft 77 which extends lengthwise of the support plate 61 and is journalled in upstanding ears 78 on the latter. Similarly, the row of auxiliary pickup elements 62B is supported on a bar 85 which is connected between its ends to a pair of levers 86, these layers being connected to a rock shaft 87 which extends along the plate 61 and is journalled in a pair of upstanding ears 88 on the latter.

Means are provided for simultaneously oppositely actuating the rows of auxiliary pickup elements 62A and 62B respectively to and from an operative position, that is, a position in which either the pickup elements 62A or the pickup elements 62B combine with the pickup elements 62 for completing a group of pickup elements to remove a group of fruit from the chute section 10, which group would constitute a layer of fruit to be boxed.

Figure 12:
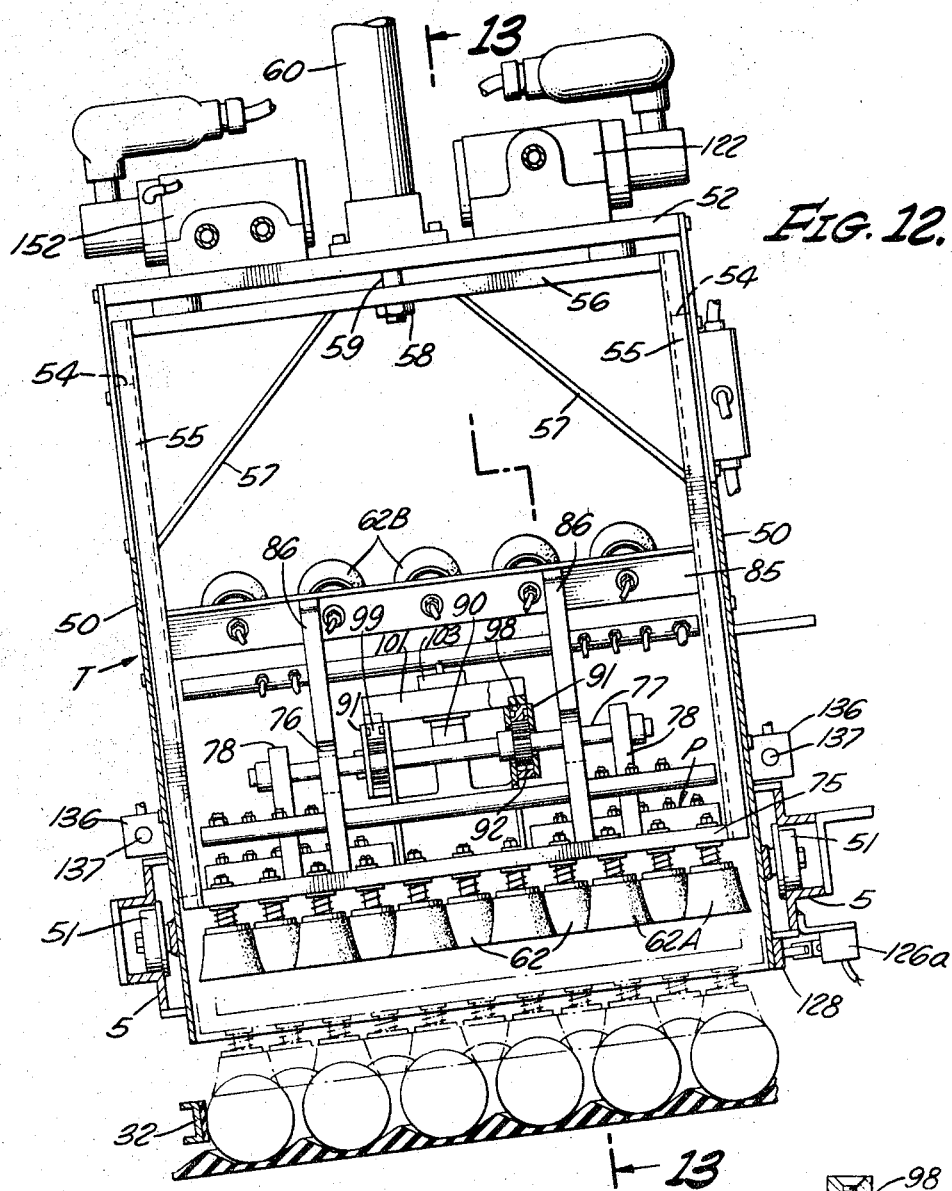
FIG. 12 is a view in vertical section as taken on the line 12—12 of FIG. 10.
Figure 13:
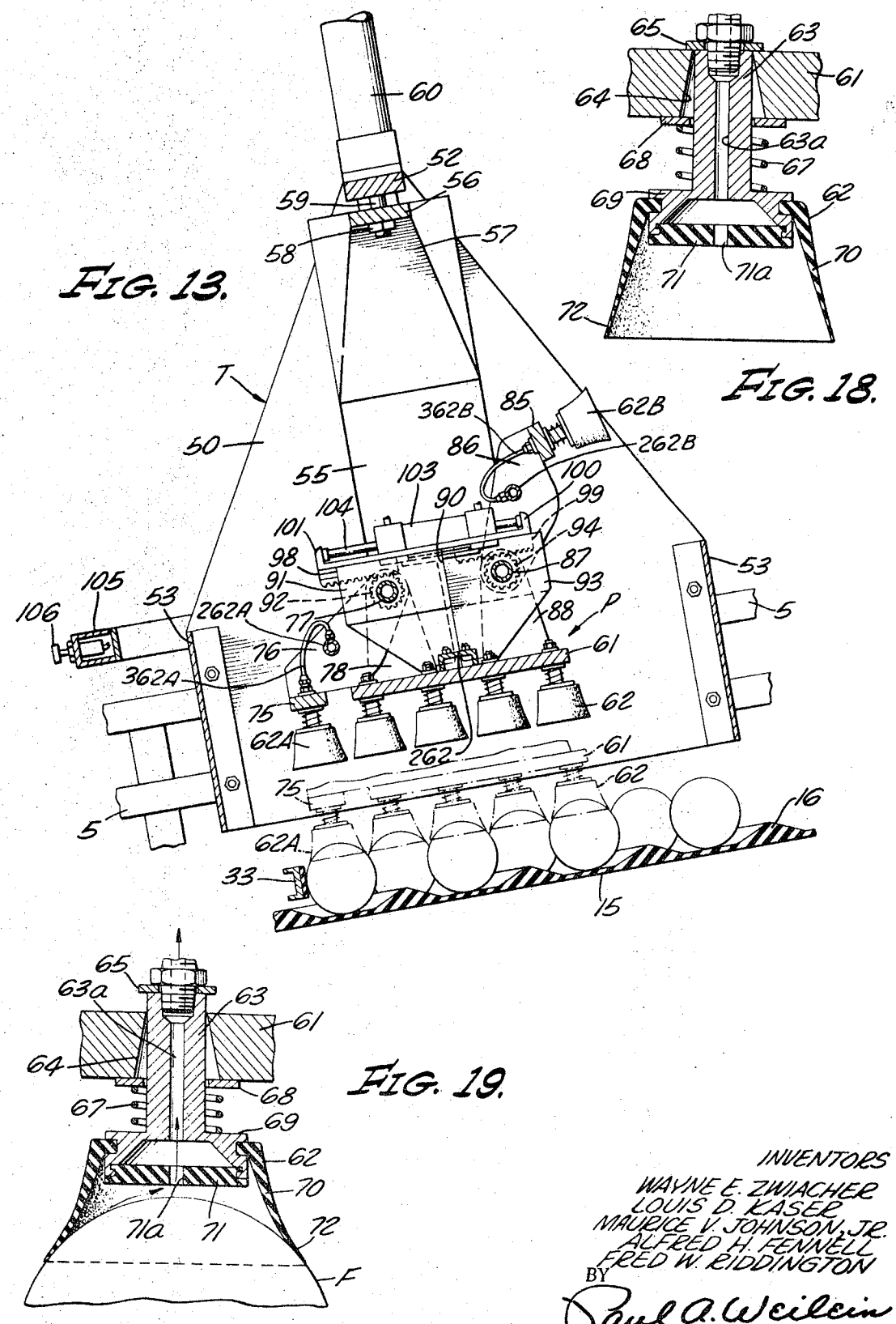
FIG. 13 is a view in section as taken on the line 13—13 of FIG. 12 showing the fruit pickup mechanism in full lines in an elevated position and in condition to pick up one fruit pattern, and fragmentarily in broken lines in engagement with the fruit on the fruit supply chute.
Figure 27:
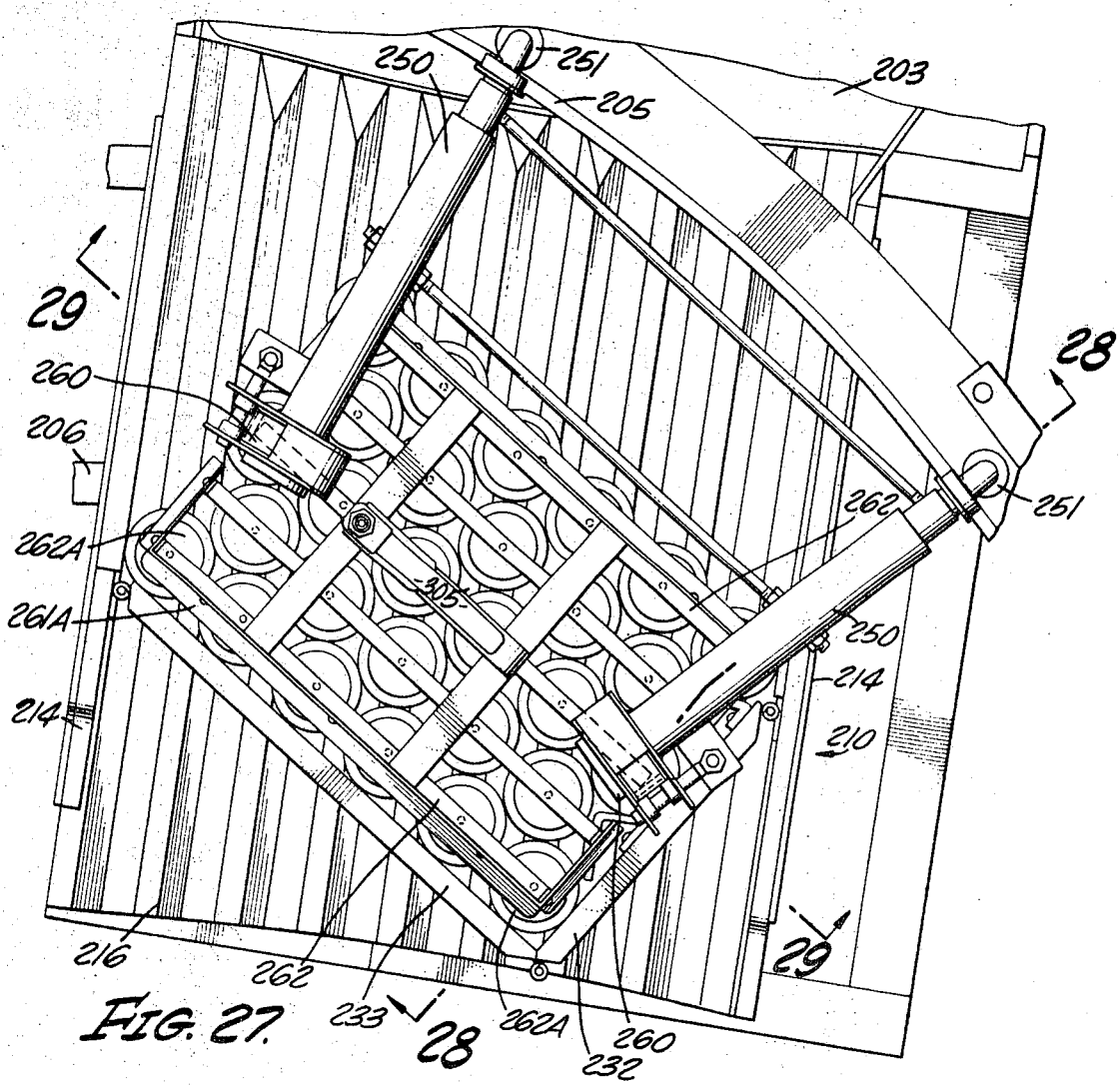
FIG. 27 is a fragmentary detail view in top plan illustrating one of the fruit transfer mechanisms of the apparatus of FIG. 25 in a position for picking up fruit.
Figure 28:
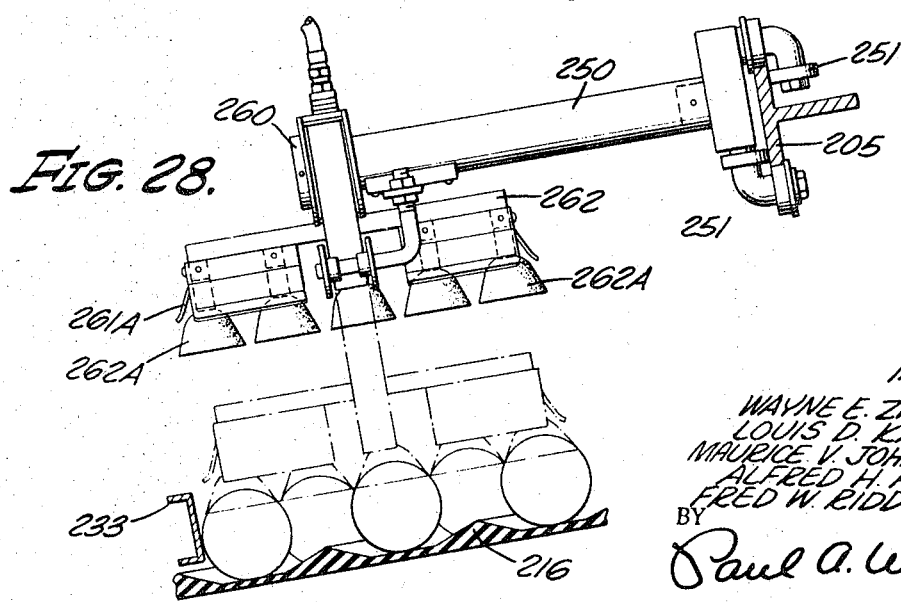
FIG. 28 is a view in section as taken on the line 28—28 of FIG. 27 showing the fruit pickup mechanism in full lines in an elevated position and in broken lines in a fruit pickup position.

Accordingly, as best shown in FIGS. 12 and 13, the support plate 61 has a supporting bracket 90 consisting of spaced walls 91 through which rock shaft 77 extends, this rock shaft having a pinion 92 thereon and a pair of spaced walls 93 through which rock shaft 87 extends, there being a pinion 94 between the walls 93 and fixed on rock shaft 87.

Referring to FIGS. 16 and 17, the details of construction of the bracket including the walls 91 are shown in greater detail and it will be understood that the bracket comprising the walls 93 would be of similar construction. In this connection, the walls 91 are joined together in spaced relation by a spacer 95 secured by fasteners 96 between the walls 91 so as to accommodate the pinion 92, which is provided with a hub 92a fastened by set screw 92b to the shaft 77. The spaced apart walls 91 are provided with guide rails 97 on which slides a rack bar 98. Similarly, the side walls 93 of the bracket are adapted to accommodate and slidably support a rack bar 99.

As seen in FIG. 11, the rack bars 98 and 99 are joined by frame members 100 and 101 so as to provide a box frame engageable either by a rod 102 or by a rod 104 projecting from opposite ends of an actuator cylinder 103 whereby upon opposite actuation of the actuator 104 the box frame comprising members 100 and 101 and the rack bars 98 and 99 will be caused to reciprocate in opposite directions thereby effecting simultaneous angular movement of the pinions 92 and 94 and angular movement in the same direction of the arms 76 and 86, resulting in either the movement of pickup elements 62B to the position shown in FIG. 13 and the corresponding movement of the pickup elements 62A to the operative position shown in FIG. 13, or the and the row of pickup elements 62B will be employed position shown in FIG. 15 and the elevations of the pickup elements 62A to the inoperative position shown in FIG. 15.

It will now be understood that under the control of the actuator cylinder 103, the pickup means P will consist of four rows of pickup elements 62 together with pickup elements 62A in the event that the rows of fruit A1–A5 are to be picked up from the supply chute section 10, which these four rows of pickup elements 62 and the row of pickup elements 62B will be employed if the rows of fruit B1–B5 are to be removed from the supply chute 10. As previously indicated, the transfer mechanism is slidably or shiftably supported on rollers 51 which engage rails 5 so as to be moved between a fruit pickup position as shown in FIG. 1, and as shown in full lines in FIG. 10, and the fruit boxing position as shown in broken lines in FIG. 10. Therefore, when rows of fruit A1 through A5 are picked up fro placement in the box, it is desired that movement of the transfer means downwardly on rails 5 be limited or reduced, as compared with the permitted movement of the transfer means when the rows B1 through B5 are to be placed in the box, by a distance equal to one row of fruit so that the fruit picked up by auxiliary pickup elements 62A will be deposited against the longitudinal side wall of the box; whereas when the B layer of fruit is boxed, the row of pickup elements 62 adjacent the inoperative pickup elements 62A will be deposited in the box adjacent the same sidewall. Means for varying such downward movement of the transfer means includes a pair of pressure operated cylinders 136 respectively carried at opposite sides of the means T on side walls 50. Each cylinder 136 has a rod 137 projecting therefrom more or less by a distance equal to one row of fruit and engageable with stops 137a on the rail structure 5, under the control of a system to be hereinafter more fully described.

Under the control of such control mechanisms, the pickup means is also adapted to pick up fruit when in the pickup position of FIGS. 1 and 10 and to be lowered into the box as shown in FIG. 14, there to release the fruit. In the illustrative embodiment the transfer mechanism may be shifted manually along rails 5 and, therefore, it will be noted that the handle portion 105 is provided between the sidewalls 50 of the transfer mechanism. To facilitate manual shifting of the transfer mechanism, there is preferably provided means for counterbalancing the transfer mechanism. Such counterbalancing means may, as shown in FIG. 10, comprise a weight 105a suported on a flexible tape or cable 105b, the cable being suitably connected to the transfer mechanism at 105c.

As previously described, the pickup elements 62 as well as 62A and 62B are adapted to be evacuated for the purpose of picking up fruit and therefore the pickup assembly also includes suitable vacuum tube connections 162, 162A and 162B suitably leading from a pump to the respective pickup elements. With reference to FIGS. 11 and 13, it will be noted that plate 61 has thereon a pair of manifolds 262 to which vacuum tubes 162 lead, and from these manifolds, tubes 362 lead to the respective pickup elements 62. Vacuum tube 162A leads to a manifold 262A which is carried by the lever arms 66 and extends along the auxiliary cup support bar 75. From the manifold 262A tubes 362A lead to the respective pickup element 62A. Similarly, vacuum tube 162B leads to a manifold 262B carried by lever arms 86 and extending along the auxiliary support bar 85 and vacuum tubes 362B lead from the manifold 262B to the respective pickup elements 62B. The handle 105 with which the transfer mechanism is shifted between pickup and discharge positions is provided with manually operated valve control elements 106 and 107 whereby to control the vacuum operated pickup elements in unison, as will more fully appear hereinafter.

Inasmuch as the pickup elements as seen in FIGS. 18 and 19 are free to partake of universal movement by virtue of the loose fit of the stem 63 in the downwardly tapered opening 64, the pickup elements will compensate for a degree of variation in the actual disposition of fruit in the respective patterns formed on the chute section 10 and by virtue of the resilient cup construction on the pickup element 62, differences in size and surface contour will be compensated for to assure effectiveness in the picking up of the fruit.

Referring now to FIG. 20, there is illustrated a schematic control system whereby the transfer mechanism as well as the supply conveyor section 10 is actuated and controlled so that when the transfer mechanism is moved from the broken line position of FIG. 10 to the full line position of FIGS. 1 and 10, the side walls 14 of the conveyor section 10 will be caused to relatively reciprocate one toward another to effect agitation and ultimate lateral compression of the rows of fruit on the conveyor into the desired pattern; upon arrival of the transfer mechanism at the pickup position, the pickup means will be lowered to effect engagement of the pickup elements 62 and either 62A or 62B with the prearranged fruit on the chute section 10; following evacuation of the pickup elements so as to grip the group of fruit thereby, this group of fruit will be picked up and elevated from the chute section 10; and upon return of the transfer mechanism to the discharge or boxing position, the pickup means will be moved downwardly to place the group of fruit held by the pickup means in the box R and the release of the vacuum holding the fruit in the pickup elements will then be effected. In the embodiment now being described, release of vacuum is effected and simultaneously a positive pressure is developed in the pickup cups to eject the fruit therefrom. Upon return of the pickup means to the elevated position, the cycle may be repeated so as to progressively pick up and box successive layers of fruit. In the control system means are provided to effect a shifting of the pickup elements 62A and 62B alternately between operative and inoperative positions so that successive layers of fruit deposited will successively consist of a layer of fruit made up of the rows A1 through A5 and a next superjacent layer of fruit made up of the rows B1 through B5 and thereafter another layer of fruit consisting of the rows A1 through A5, etc.

Included in the control system is a stepping switch mechanism generally designated at 110 provided with a DC source of current from a source 111 through a line 112, a capacitor-resistor connection 113, and a lead 114. The stepping switch 110 is of a conventional type and is provided with, for example, five positions for the purpose of controlling the pickup mechanism in the placement of five layers of fruit within the box R. Positions 1, 3, and 5 in the stepping switch are designated as A positions, whereas positions 2 and 4 are designated as B positions for a reason which will hereinafter more fully appear.

In the diagram, the stepping switch 110 is adapted to be caused to progress incrementally through positions 1A through 5A and then resume at position 1A in a step-by-step fashion each time that a control switch interposed in conductors 112, 114, and designated 115 is closed. As seen in FIG. 10, switch 115 is located on the supporting framework for the transfer mechanism T and has an actuator arm 115a adapted to be engaged and actuated by a member 115b projecting from a side wall 50 of the transfer mechanism, as the latter is moved from the broken line position of FIG. 10 to the full line position, whereby to momentarily close switch 115 and thus effect an increment of actuation of the stepping switch 110. A switch 112a is interposed between the source of electric current and the switch 115 so that when desired, as will be hereinafter described, the stepping switch 110 may be rendered inoperative.

Assuming now that the transfer mechanism T has been moved from the broken line position of FIG. 10 to the full line position shown therein and that the member 115b has closed switch 115 to cause the stepping switch to be in a condition in which a circuit is completed at position 1A, it will be noted that a source line 119 leads to solenoid valve 120 and that a ground line 123 leads to station 1A of the stepping switch from the valve 120. To complete the circuit at this station of the stepping switch from line 123, the stepping switch has an arm 124' in circuit with a ground line 124. Solenoid valve 120 controls actuators 136 for stops 137 whereby to vary the discharge position of the transfer means T by a distance equal to the width of a row of fruit, as previously described. In the conductor 119 is a branch line 121 which leads to a solenoid valve 122 which connects either pickup elements 62A or 62B with a vacuum pump or source of air, as will be later described.

Also energized at stepping switch station 1A is a branch circuit 117 containing a signal light 118 which will be energized to indicate that the stepping switch 110 is operative at station 1A.

Another branch conductor 125 leads from conductor 119 to a solenoid valve 126 which is controllable by a microswitch 126a. This microswitch 126a is, as seen in FIG. 10, supported on one of the transfer mechanism rails 5 in a position to be engaged by lobes 127 of a cam bar 128 which is provided between the lobes with depressions 129. The microswitch 126a will be actuated as it engages the lobes and depressions 127 and 129 of the cam bar 128 as the transfer mechanism T is moved toward its full line position of FIG. 10, the circuit comprising conductor 130 leading between the microswitch 126a and the valve 126 being completed by the ground line 131 leading from the microswitch 126a and back to a junction at 132 with the ground line 124.

Leading to the solenoid valve 120 from a source of compressed air is a conduit 133 which joins with an air source conduit 134, this source conduit also being connected by a conduit 135 to the solenoid valve 126. Leading from solenoid valve 120 is a conduit 120A and a second conduit 120B. Leading from conduit 120A to one end of the actuator cylinder 103 previously described is a conduit 103A. In addition, a pair of conduits 136A lead from conduit 120A to the corresponding ends of the cylinders 136. A pair of conduits 136B lead from the conduit 120B to the corresponding other ends of the cylinders 136 and a conduit 103B leads from the conduit 120B to the end of cylinder 103 opposite the connection of line 103A to the cylinder 103.

It will now be apparent that under the control of the solenoid valve 120, air under pressure is adapted to be supplied to either conduit 120A and from the latter through conduit 103A to cylinder 103 and through conduits 136A to cylinders 136 or alternatively through conduit 120B and conduit 103B to the cylinder 103 and through conduits 136B to cylinders 136. When the solenoid valve 120 is energized through the stepping switch at position 1A, air under pressure will be supplied to conduit 120A and therefore the actuator cylinder 103 will cause the rod 104 to be extended from the cylinder as shown in FIG. 20 to move pickup elements 62a into operative position along with pickup elements 62. Likewise, the supply of air under pressure to cylinders 136 will cause the outward projection therefrom of stop rods 137 as previously described.

The supply of air through conduit 135 to solenoid valve 126 will, as the microswitch 126A is intermittently actuated by the cam bar 128, be passed to a conduit 140 leading from solenoid valve 126 to the actuator cylinder 30 which, through the lever arms 25, chains 20, and sprockets 19, cause intermittent lateral reciprocation of the side walls 14 of chute section 10 as previously described. Preferably, the supply of air through the conduit to cylinder 30 will be exhausted at the time that the pickup means engages fruit on the chute section 10 so that the side walls 14 will be biased toward one another whereby to apply a desired compressive load on the group of fruit to be picked up and assist in the proper relative positioning of the fruit within the group.

At this time it is desired that the pickup means be lowered to bring the pickup elements 62 and 62a into engagement with the fruit on the chute section 10. The supply of air to the cylinder 60 is through a conduit 141 leading from the above described conduit 133 to a solenoid valve 142 having a conduit 143 leading to the upper end of cylinder 60 and a conduit 144 leading to the lower end of cylinder 60. Solenoid valve 142 is controlled by a circuit including a conductor 145 leading from hand operated switch 107 to the solenoid valve and another conductor 146 which leads to the ground 131 referred to above. This arrangement is such that when the switch 107 is closed the pickup means will be moved downwardly, whereas when the switch 107 is open, the pickup means will be elevated.

The means whereby the fruit on the chute section 10 may be picked up by the pickup elements or cups 62 and 62A as now being described, includes a vacuum pump 150 from which extends a conduit 151, this conduit leading to a solenoid valve 152. Leading from the solenoid valve 152 is a conduit 153 which is in communication with the various lines 162 leading to the vacuum cups 62. In the normal position of solenoid valve 152 conduit 151 is in communication with the conduit 153 so that vacuum will be created in the cups as they engage the fruit to be picked up. In order to provide vacuum at the cups 62A, and as will hereinafter appear also to the cups 62B, there is a conduit 154 leading from the solenoid valve 152 to the solenoid valve 122 previously described. Leading from solenoid valve 122 is the conduit 162A which is connected to the cups 62A and also leading from the solenoid valve 122 is the conduit 162B connected to the cups 62B. When the stepping switch which controls solenoid valve 122 is, as now being described, in the 1A position, as well as in either of the 3A or 5A positions, the solenoid valve 122 will be conditioned so that the vacuum conduit 154 communicates through valve 122 with conduit 162A and cups 62A will be evacuated along with cups 62. Fruit will thus be picked up by all of the pickup elements 62A and 62.

The pickup means will be elevated simply by release of the switch 107, air thereby being supplied to the lower end of actuator cylinder 60. The transfer mechanism may then be moved to the broken line or boxing position shown in FIG. 10 and upon reaching this position switch 107 may be closed to cause the pickup means to be moved downwardly into the box as shown in FIG. 14.

At this point it is desired that the fruit be released from the cups 62A and 62 and preferably that the fruit be positively ejected from the cups. Therefore, solenoid valve 152 is such that when actuated by closure of switch 106, the valve will establish communication between an air conduit 155 through ports 152A as indicated in broken lines of valve 152 to conduit 153 as well as to conduit 154 and these latter conduits will simultaneously be disconnected from the vacuum pump 150. Such shifting of the valve 152 obviously therefore causes the connection of the source of air pressure to all of the cups 62A and 62, so long as the switch 106 is held closed.

After the fruit have been discharged from the cups 62A and 62, both of the switches 106 and 107 are released, so that the supply of air to the cups is shut off by valve 152 and the vacuum connection is re-established and also the pickup means will be elevated as air is supplied through valve 142 to the lower end of actuator cylinder 60.

The foregoing has resulted in the placement in the box R of the layer of fruit consisting of the rows A1 through A5 and now it is desired that the group of fruit consisting of the rows B1 through B5 be placed in the box. Therefore, the transfer mechanism is manually moved from the broken line position of FIG. 10 to the full line position and during the course of this movement the operating member 115b on the side wall 50 of the transfer mechanism will actuate switch 115 by engaging arm 115a of the latter, thus stepping the switch 110 to position 2B which is a blank position interrupting the circuit completed at station 1A.

In the 2B position of the stepping switch 110, the circuit through conductor 119 to solenoid valves 122 and 129 will be interrupted and under these circumstances air will be supplied through valve 120, as shown in broken lines, to the conduit 120B and thence through lines 136B to actuator cylinders 136 to cause the retraction of the stops 137, and likewise air will be supplied through conduit 103B to the left hand end of actuator cylinder 103, thereby causing retraction of rod 104 with consequent elevation to an iroperative position of pickup elements 62a as well as extension of rod 102 and the lowering of pickup elements 62B into operative relation with pickup elements 62.

The operation described above involving the lowering of the pickup means, the picking up of the fruit, the raising of the picked up fruit, and ultimate depositing of such fruit in the box will proceed as previously described, except to note that inasmuch as the stops 137 have been retracted, the transfer means T will be enabled to travel down the rails 5 an additional distance equivalent to the width of the row of fruit A1 so that the row of fruit supported in the row of cups 62 at the left hand side of the support plates 61, as seen in FIG. 20, will be deposited vertically above and have nesting relation with the row of fruit A1 previously deposited in the box.

This operation will continue until, as in the illustrative embodiment, the cycle has been completed through the five positions of the step switch 110 at which time the box R will be removed and an empty box substituted therefor. Arrival of stepping switch arm 124' at position 1A and illumination of light 118 will serve as an indication that a cycle has been completed. Hence, each time the signal light is energized it will indicate to an operator that he has completely filled a receptacle.

If it be desired that a stacked type of pack be provided in which each of the layers of fruit would be the same, either all composed of A rows or B rows, the switch 112a previously referred to may be opened to render stepping switch 110 inoperative. In such event, no shifting of the auxiliary cup supports will occur and either cups 62A and 62 or the cups 62B and 62, depending upon the position of stepping switch when it is rendered inoperative will be employed repetitively in picking up and boxing successive layers.

Referring now to FIGS. 21–24, a modification of the chute section 10 is illustrated wherein similar reference characters are employed to indicate the same components. In these views of the drawings it will be noted that in lieu of the barriers 32 and 33 hingedly connected to the side walls 14 of the chute section 10 as in the first described embodiment, the rows of fruit extending between the ridges 16 of the chute are arrested by individual abutment elements 32' and 33'. Such abutment elements in the modified construction may conveniently comprise upstanding lugs secured as by a fastener 32" and a reinforcing plate 32''' to the webs of the base 15 of the chute section 10 between adjacent ridges 16. In addition, in order to prevent fruit in the second and third rows from the top as viewed in FIGS. 21 and 22 from being caused during agitation of the fruit to be displaced over an adjacent ridge 16, a longitudinally extended baffle 33" may be employed, such baffles being secured to the base of the chute section 10 in the same manner as the lugs 32' and 33'.

Referring now to FIGS. 25–31, a modified assemblage is shown whereby the objectives of the invention may be accomplished.

In this embodiment of the apparatus, a pair of laterally spaced supporting frames 201 are provided, each supporting a supply chute assembly C including a supply chute 203 leading to a chute section 210, the latter respectively having side walls 214 which, in a manner to be later described, are adapted to be moved one toward the other to effect agitation and compression of the fruit so as to establish the desired pattern.

In addition, each of the chute sections 210 has barriers 232 and 233 hingedly interconnected together and to the side walls 214, as in the first described embodiment, for limiting the travel of the fruit downwardly between the ridges 216 of the chute section 210.

In this embodiment the fruit transfer mechanism involves individual pickup means each comprising a supporting framework 250 supported on rollers 251 so as to be manually movable between a fruit pickup position and a fruit boxing position along the arcuate supporting rail 205. The arc of rail 205 is such that when the respective pickup means supported on their frames 250 are disposed above the chute sections 210, the pickup means are oriented generally in angular relation to the chute 210 so as to overlie a group of fruit on the respective chute sections 210 corresponding to the group which is to be placed within the box. On the right hand chute 210 as viewed in FIG. 25 there are formed groups of fruit consisting of rows A1 through A5 while on the left hand chute section 210 there are formed groups of fruit consisting of rows B1 through B5.

Interposed between the frameworks 201 is a support 206 for a box or receptacle R. It is the function of the pickup means to remove the respective groups of fruit A1 through A5 and B1 through B5 successively from the respective fruit sections 210 to a position overlying the box R and then to deposit the groups of fruit in the box, until the box is filled.

A pair of pickup means are employed, as mentioned above, each being essentially identical and respectively comprising a main supporting frame 261A and 261B each having stringers 262 adapted to support cups 262A and 262B. The rows of cups 262A carried by frame 261A are, as will now be understood, arranged and spaced and have such number as to coincide with the rows of fruit A1 through A5, while the cups 262B carried by frame 261B are adapted to engage and pick up the fruit consisting of rows B1 through B5. Each of the frames 261A and 261B is supported on its support 250 by a pair of spaced spring rewound roll and flexible tape assemblies 260, whereby the frames are adapted to be manually vertically moved between upper positions spaced from the chute sections 210 to a lower position with the respective cups in engagement with the fruit on the chute sections 210. For this purpose, each of the frames 261A and 261B is provided with a handle grip 305A and 305B. This handle grip includes a valve assembly whereby each of the cups is connected to a vacuum pump (not shown) under normal circumstances. Upon actuation of a valve operator 305' to close a passage 305" on the hand grip, vacuum will be applied to all of the cups through a passage 305'''. However, upon release of the handle, the passage 305''' will communicate with atmosphere through passage 305" thus breaking the vacuum grip of the cups with the fruit.

Upon reference to FIG. 31, it will be noted that each of the pickup elements includes a cup having a resilient neck 263 and that the stringers are hollow so as to establish joint communication of all of the cups with the vacuum pump or with the vacuum breaking passage 305" as the case may be.

As in the first described embodiment, the present embodiment includes means which will effect movement of the side walls 214 of the chute section 210 one toward the other end and in this connection reference is made particularly to FIG. 30 wherein it will be observed that the base 215 of this chute section rests on a relatively stationary plate 212 relative to which a plate 213 is laterally reciprocable. Means for reciprocating plate 213 includes a chain 220 extended about a sprocket 219, the latter being mounted on a rock shaft 217 adapted to be rocked by a crank arm 225 connected to a head 227 of an actuator rod 229 projecting from the actuator cylinder 230. Actuator cylinder 230 of each assembly is supported on the respective base frame 201.

For effecting projection of the rod 229 and thus movement of plate 213, a solenoid operated valve 226 is adapted to be connected to a source of air supplied through a conduit 235. The solenoid valve is respectively adapted to be energized under the control of a pair of microswitches 226a one of which is mounted on the arcuate support rail 205 above one of the chute sections 210 and another of which is mounted on such rail adjacent the other chute section 210. An operating arm 227 projects from each of the respective microswitches 226a so as to be engaged by the rollers 251 as the same pass by the actuator arm 227 of the switches. When the actuator arm 227 is engaged air will be supplied to the cylinder 230 to cause projection of the rod 229 and angular movement of the sprocket 219 in a direction to cause movement of the plate 213 to the right as viewed in FIG. 30. As the rollers 251 pass the operator arms 227, the switch will be de-energized and the plate 213 will move in the opposite direction so as to cause movement of the one wall 219 toward the other.

In the operation of this embodiment it will be appreciated that an operator will stand facing the receptacle support 206 and will grasp handle 305b in one hand and handle 305a in the other hand. To commence filling the box, the operator will move pickup frame 216A downwardly to effect engagement of the pickup cups 262A with the fruit disposed therebeneath and will depress the vacuum valve actuator arm 305' thereby evacuating cups 262A. Then the opertaor will elevate the pickup means and manually cause the same to move along the arcuate support rail 205 to a position just above the box R. During the course of this travel of the pickup means the microswitch 226a will be actuated twice as the rollers 251 pass by and engage the actuator arm 227 so as to effect relative movement of the side walls of the chute section 210 to agitate and laterally compress a succeeding group of fruit. The operator may then manually move the pickup mechanism downwardly into the box R whereupon he will release the vacuum valve operator 305' thereby establishing communication of all of the cups with atmosphere so that the fruit will be released. The operator will then elevate the pickup frame 261A and return it to its original position and follow the same operation with the pickup frame 261B, etc., until the box is filled.

While the specific details of a number of illustrative embodiments of apparatus have been herein shown and described, it will be understood that changes and alterations may be made without departing from the invention. It is notable that each of the apparatus is capable of performing related steps in the boxing of articles which include the steps of prearranging articles on the feed chute in a pattern corresponding to the pattern which a layer of such articles will assume in a box, picking up the group of such articles making up such pattern and transferring them to the box, and thereafter picking up and transferring a second group of articles also prearranged on the feed chute in such a manner that the second group of articles will constitute the second layer, the articles of which will nest with the previously boxed layer.

We claim:

1. The method of boxing articles, comprising feeding articles in supply rows longitudinally of a supply chute with the articles in each row staggered relative to the articles in an adjacent row; picking up from said supply chute a group of the articles, the group being of the general configuration of a rectangle with the rectangle oriented diagonally of the supply rows, the group consisting of a number of rows of articles extending diagonally of said supply chute and longitudinally of the rectangle, each of most of the supply rows providing one article for each of a plurality of the diagonally extending rows, and placing said group of articles in a rectangular box with the rectangular configuration of the group conforming to the rectangular configuration of the box.

2. The method of claim 1 including, picking up a second similarly oriented rectangular group of articles from a supply chute in which the rows of articles extending longitudinally of the group contain one more or less article than the corresponding diagonal rows of the first mentioned group, and placing the second group in the box in overlying and nesting relation with said first group of articles.

3. The method of boxing fruit or like articles of generally round configuration in plan, comprising: arranging the articles in closely spaced parallel supply rows with the supply rows offset longitudinally and with articles of adjacent supply rows diagonally aligned and forming rows diagonally of the supply rows; and transferring a group of such arranged articles consisting of a plurality of said diagonal rows to a box with the diagonal rows disposed parallel to opposed sides of the box.

4. The method of boxing fruit or like articles, comprising: arranging articles in longitudinally extended rows with the rows offset longitudinally and with articles of adjacent rows diagonally aligned and forming diagonal rows; transferring a group of such arranged articles consisting of a plurality of said diagonal rows to a box with said diagonal rows disposed parallel to opposed sides of said box; and thereafter transferring a second group of such arranged articles to said box with said diagonal rows of said second group respectively disposed above a diagonal row of the previous group.

5. The method of boxing fruit or like articles, comprising: feeding articles from a source on supply chute means in longitudinally extended rows; arranging the rows of articles in longitudinally offset relation with articles of adjacent rows diagonally aligned and forming diagonal rows; transferring to a box as a group a plurality of such diagonally arranged rows with the diagonal rows disposed parallel to opposed sides of said box; and thereafter transferring to said box another group of said diagonally arranged rows each having one more or less article than the corresponding previous diagonal row with the diagonal rows of said another group disposed parallel to opposed sides of said box and the articles of said another group nesting with the articles of the previous group of rows in the box.

6. The method of claim 5, including compressing the longitudinally extended rows transversely of the chute means to arrange the articles of the respective longitudinally extended rows in transversely nested relation with one another.

7. The method as defined in claim 5, in which the groups of articles are successively transferred from the same chute means.

8. The method as defined in claim 5, in which the groups of articles are arranged on and transferred from different chute means.

9. The method of claim 5, in which the longitudinally extended rows of articles are agitated while being fed in longitudinally extended rows along said chute means.

10. The method of boxing articles, comprising: feeding articles in supply rows longitudinally of a supply chute with the articles of each supply row staggered relative to an adjacent supply row; picking up from said supply chute a group of articles consisting of a number of parallel rows of articles extending diagonally of said supply chute, the group including several articles from each of several supply rows; and placing said group of articles in a box with said parallel rows of articles disposed parallel to opposite side walls of the box.

11. The method of boxing articles, comprising: feeding articles in supply rows longitudinally of a supply chute; picking up from said supply chute successive groups of articles, each group consisting of a number of parallel rows of articles extending diagonally of said supply chute, each group including several articles from each of several supply rows; and successively placing said groups of articles in a box with said parallel rows of articles disposed parallel to opposite side walls of the box to form successive layers of the articles stacked on one another.

12. A method of boxing articles, comprising: feeding articles in supply rows longitudinally of a supply chute with the articles of each row staggered relative to an adjacent row; picking up from said supply chute successive groups of articles, each group consisting of a number of parallel rows of articles extending diagonally of said supply chute, each group including several articles from each of several supply rows; and successively placing said groups of articles in a box with said parallel rows of articles disposed parallel to opposite side walls of the box and with successive groups of articles nested one with another.

13. A method of packing articles of generally round configuration in a rectangular box, characterized by the steps of: feeding the articles in closely spaced parallel supply rows in a supply chute with the articles in each row staggered relative to the articles in an adjacent row so that the articles form parallel rows extending diagonally of the supply rows; positioning said box adjacent the supply chute with the box aligned with said parallel diagonal rows; picking up from said supply chute a group of the articles with the group of the general configuration of a rectangle and with said parallel rows extending longitudinally of the group, the group including several articles from each of several supply rows; and moving said group to said box along a diagonal path aligned with the diagonal rows to deposit the group in the box as a layer in the box with the parallel rows of the group parallel with the sides of the diagonally positioned box.

14. A method as set forth in claim 13 in which successive groups are deposited in the box to make successive layers therein and in which the successive groups are of alternate patterns that are complementary to each other in the sense that the complementary patterns partially nest together.

15. A method of packing articles of generally round configuration in a rectangular box, characterized by the steps of: feeding the articles in closely spaced parallel supply rows in a first supply chute with the articles in each supply row staggered relative to the articles in an adjacent supply row so that the articles form parallel rows extending diagonally of the supply rows; feeding the articles in closely spaced parallel supply rows in a second supply chute with the articles in each supply row staggered relative to the articles in an adjacent supply row so that the articles form parallel rows extending diagonally of the supply rows; positioning said box between the two supply chutes; repeatedly picking up from said first supply chute a group of the articles with the group of the general configuration of a rectangle oriented diagonally of the supply rows and with said parallel diagonal rows extending longitudinally of the rectangle; repeatedly picking up from said second supply zone similarly oriented rectangular groups of the articles; and alternately depositing the groups from the two supply chutes in said box to form successive layers in the box, each of said groups including several articles from each of several supply rows; said groups taken from the two supply chutes being complementary in the sense that the groups partially nest together in the box.

References Cited
UNITED STATES PATENTS

| | | | |
|---|---|---|---|
| 2,313,500 | 3/1943 | Anderson | 53—247X |
| 2,464,515 | 3/1949 | Kennedy | 107—19.3X |
| 3,292,341 | 12/1966 | Frost | 53—247X |

THERON E. CONDON, Primary Examiner

N. ABRAMS, Assistant Examiner

U.S. Cl. X.R.

53—35

UNITED STATES PATENT OFFICE
CERTIFICATE OF CORRECTION

Patent No. 3,553,926             Dated January 12, 1971

Inventor(s) Wayne E. Zwiacher et al

It is certified that error appears in the above-identified patent and that said Letters Patent are hereby corrected as shown below:

Column 8, line 10, "layers" should read --levers--; line 54 should read as follows, --movement of the pickup elements 62B to the operative--; line 63, "which" should read --while--; line 72, "fro" should read --for--.

Signed and sealed this 13th day of July 1971.

(SEAL)
Attest:

EDWARD M. FLETCHER, JR.
Attesting Officer

WILLIAM E. SCHUYLER, JR.
Commissioner of Patents